US007887208B2

United States Patent
Tsukada

(10) Patent No.: US 7,887,208 B2
(45) Date of Patent: Feb. 15, 2011

(54) DIRECT TYPE BACK-LIGHT DEVICE

(75) Inventor: Keisuke Tsukada, Tokyo (JP)

(73) Assignee: Zeon Corporation, Tokyo (JP)

( * ) Notice: Subject to any disclaimer, the term of this patent is extended or adjusted under 35 U.S.C. 154(b) by 203 days.

(21) Appl. No.: 11/992,097

(22) PCT Filed: Sep. 15, 2006

(86) PCT No.: PCT/JP2006/318351
§ 371 (c)(1),
(2), (4) Date: Mar. 14, 2008

(87) PCT Pub. No.: WO2007/032469
PCT Pub. Date: Mar. 22, 2007

(65) Prior Publication Data
US 2009/0268428 A1 Oct. 29, 2009

(30) Foreign Application Priority Data
Sep. 15, 2005 (JP) .............................. 2005 269273
Nov. 30, 2005 (JP) .............................. 2005 347294

(51) Int. Cl.
*G09F 13/04* (2006.01)
(52) U.S. Cl. .................... 362/97.1; 362/97.3; 362/97.2; 362/97.4; 349/62; 349/63; 349/64; 349/69; 349/70
(58) Field of Classification Search ....... 362/97.1–97.4, 362/355, 606, 339; 349/62, 64, 69, 70, 63
See application file for complete search history.

(56) References Cited

U.S. PATENT DOCUMENTS 7,645,058 B2 * 1/2010 Kurokawa et al. .......... 362/339

2002/0142133 A1 * 10/2002 Matsunaga et al. .......... 428/141
2006/0256582 A1 * 11/2006 Chuang ...................... 362/620

FOREIGN PATENT DOCUMENTS

WO      WO 2005083475 A1 *   9/2005

* cited by examiner

Primary Examiner—Jong-Suk Lee
Assistant Examiner—Robert J May
(74) Attorney, Agent, or Firm—Birch, Stewart, Kolasch & Birch, LLP

(57) ABSTRACT

A direct type back-light device comprising: a reflection plate; a plurality of linear light sources disposed in parallel; and a light diffusion plate disposed, in this order, in which the light diffusion plate includes on at least one main surface a plurality of concave or convex structural units each having three or more sloped sides, has a maximum height Rz of the main surface having the structural units being not more than 1000 μm, and in a vertical cross section of the light diffusion plate, which lies immediately above a region between central axes of adjacent linear light sources and in which a direction perpendicular to a central axis direction of the linear light source is defined as a cutting-plane line, includes a portion: in which the number of lines representing the sloped sides n of which gradients Xn (unit:degree, where n is a natural number and is a subindex for representing each sloped side) differ is 2 or more, and in which all gradients Xn have, between an average distance $a_L$(mm) between the central axes of the adjacent linear light sources and a minimum distance $b_L$(mm) between the central axis of the linear light source and the main surface facing the linear light source in the light diffusion plate, a relationship of $12.5-10\times(b_L/a_L)<Xn<85-25\times(b_L/a_L)$.

24 Claims, 8 Drawing Sheets

DIRECT TYPE BACK-LIGHT DEVICE

TECHNICAL FIELD

The present invention relates to a direct type back-light device used in a display device such as a liquid crystal display. More specifically, the present invention relates to a direct type back-light device having high brightness and good brightness uniformity.

BACKGROUND ART

Conventionally, as a back-light device for a liquid crystal display, devices equipped with a cold-cathode tube as a light source are widely used. There are types of such devices called an edge light type and a direct type. The edge light type device is a back-light device which includes thin cold-cathode tube arranged at an end surface of a light guide plate, and light which has been incident from the end surface repeatedly reflects in the light guide plate, and then, is emitted to a main surface of the light guide plate. On the other hand, the direct type back-light device is that which includes a combination of a plurality of cold-cathode tubes arranged in parallel, a reflection plate provided behind the cold-cathode tube, and a light diffusion plate which serves as a light-emitting surface. In contrast to the edge light type device, in the direct type back-light device, the number of cold-cathode tubes to be used can be increased, and therefore, brightness on the light-emitting surface can be easily increased.

However, the direct type back-light device has a problem of poor brightness uniformity on the light-emitting surface. Particularly, periodical unevenness in brightness caused by high brightness at portions immediately above the cold-cathode tubes is a major problem. That is, when the brightness uniformity on the light-emitting surface of the back-light device is poor, unevenness in display occurs on a display screen of a liquid crystal display.

In the direct type back-light device, it is possible to improve the brightness uniformity by decreasing intervals between the cold-cathode tubes. However, such a solution results in an increased number of cold-cathode tubes, which causes a problem in that a structure of the back light becomes complicated and power consumption at the time of illumination increases. Alternatively, it is possible to improve the brightness uniformity by increasing a distance between the cold-cathode tubes and the light diffusion plate. In that case, however, the back-light device becomes thick, and thus, it is not possible to realize a thin liquid crystal display.

Conventionally, various measures to improve the brightness uniformity have been taken. For example, there has been proposed a method in which a light amount correction pattern consisting of a strip or a dot pattern is printed on the light diffusion plate to decrease a light amount emitted immediately above the cold-cathode tubes to relatively increase a light amount emitted between the cold-cathode tubes (illustrated in FIG. 6 of Patent Document 1), and a method in which a wavy reflection plate is used to collect reflection light from the reflection plate in a region which corresponds to a midpoint between the cold-cathode tubes (Patent Document 2).

However, when the light amount correction pattern is printed as means for improving the brightness uniformity, a part of light amount is blocked. Therefore, a utilization ratio of the light amount emitted from the cold-cathode tubes decreases, which leads to a problem in that sufficient brightness cannot be obtained. The use of the wavy reflection plate complicates a device configuration, thereby resulting in a problem in that the back-light device becomes complicated.

On the other hand, in the light diffusion plate used in the direct type back-light device, a material in which light diffusing agent is dispersed in a transparent resin is often used. However, in the light diffusion plate using such a material, when concentration of the light diffusing agent is increased to improve the brightness uniformity, there is a problem in that the brightness is decreased. Therefore, to solve this problem, there has been proposed the formation of a pattern such as a prism form or the like on a surface of the light diffusion plate to provide a diffusion effect exerted by the surface shape without decreasing the brightness (Patent Documents 3, 4, and 5). However, such a prismatic pattern on the surface of the light diffusion plate alone cannot achieve sufficient improvement in the brightness uniformity.

For example, in the Patent Documents 3 to 5, as a shape of prismatic ridges, a sawtooth cross-sectional shape is used. In addition thereto, instead of a sawtooth-shaped cross-sectional protrusion, there has been proposed the use of a sheet having a polypyramid-shaped protrusion to enhance a brightness improving effect (Patent Document 6). However, when the sheet having the polypyramid-shaped protrusion is used, the brightness uniformity cannot be improved.

[Patent Document 1] Japanese Patent Laid Open No. H6-273760 official gazette

[Patent Document 2] Japanese Patent Laid Open No. 2001-174813 official gazette

[Patent Document 3] Japanese Patent Laid Open No. H5-333333 official gazette

[Patent Document 4] Japanese Patent Laid Open No. H8-297202 official gazette

[Patent Document 5] Japanese Patent Laid Open No. 2000-182418 official gazette

[Patent Document 6] Japanese Patent No. 3134422 official gazette

DISCLOSURE OF INVENTION

Problem to be Solved by the Invention

The present invention relates to improvement of a direct type back-light device, and it is an objective of the present invention to provide a thin direct type back-light device capable of realizing a high light utilization ratio, inhibiting periodic unevenness in brightness caused on a light-emitting surface, and simultaneously realizing improvement in both brightness and brightness uniformity.

Means for Solving Problem

As a result of elaborate research to solve the above-described problems, the present inventor has found the following: a direct type back-light device is provided with a specific concave or convex structural unit on at least one main surface of a light diffusion plate, and a light diffusion plate and linear light sources being arranged, in which the light diffusion plate is configured to have a specific relationship among a gradient of a sloped side of the structural unit, a distance between central axes of adjacent linear light sources, and a distance between the central axes of the linear light sources and a main surface facing the linear light source in the light diffusion plate. As a result, a direct type back-light device having high brightness and good brightness uniformity can be obtained. Based on this finding, the present inventor has carried out further research to complete the present invention.

That is, the present invention includes the following modes:

(1) A direct type back-light device comprising:
a reflection plate,
a plurality of linear light sources disposed in parallel and
a light diffusion plate, disposed in this order, wherein the light diffusion plate is configured to:
include a plurality of concave or convex structural units, in which each of the units has three or more sloped sides, on at least one main surface,
have a maximum height Rz of the main surface having the structural units being not more than 1000 μm, and
include a portion in a vertical cross section of the light diffusion plate, which lies immediately above a region between central axes of adjacent linear light sources and in which a direction perpendicular to a central axis direction of the linear light source is defined as a cutting-plane line:
(1) in which there are no less than 2 lines showing the differing sloped sides n having the gradients $X_n$ (unit:degree, where n is a natural number and a subindex for representing each sloped side) and
(2) in which all gradients $X_n$ have, between an average distance $a_L$(mm) between the central axes of the adjacent linear light sources and a minimum distance $b_L$(mm) between the central axis of the linear light source and the main surface facing the linear light source in the light diffusion plate, a relationship of $12.5-10\times(b_L/a_L)<X_n<85-25\times(b_L/a_L)$ (2) A direct type back-light device comprising:
a reflection plate,
a plurality of point light sources and
a light diffusion plate, disposed in this order, wherein the light diffusion plate is configured to:
include a plurality of concave or convex structural units, in which each of the units has three or more sloped sides, on at least one main surface,
have a maximum height Rz of the main surface having the structural units being not more than 1000 μm, and
include a portion in at least one of vertical cross sections of the light diffusion plate, which lies immediately above a region which is surrounded by adjacent three point light sources and which does not include other point light sources and in which a direction perpendicular to a direction which links centers of two point light sources, out of the three point light sources, is defined as a cutting-plane line:
(1) in which there are no less than 2 lines showing the differing sloped sides n of the gradients $X_n$ (unit:degree, where n is a natural number and a subindex for representing each sloped side), and
(2) in which all gradients $X_n$ have, between an average distance $a_P$(mm) among the centers of the three adjacent point light sources and a minimum distance $b_P$(mm) between the center of the point light source and the main surface facing the linear light source in the light diffusion plate, a relationship of $12.5-11\times(b_P/a_P)<X_n<85-28.5\times(b_P/a_P)$.

(3) The direct type back-light device according to the above, wherein
the structural units are convex each, and
the structural units are obtained by applying a V-shaped cutting in prismatic ridges having a sawtooth-shaped cross-section in a direction different from a ridge line direction of the prismatic ridges.

(4) The direct type back-light device according to the above, wherein each shape of the structural units is pyramidal or truncated pyramidal.

(5) The direct type back-light device according to the above, wherein
the structural units are concave each, and
the structural units are obtained by transcribing a convex shape of a transcribing member having the convex shape to prismatic ridges having a sawtooth-shaped cross-section, the transcribing member being obtained by applying a V-shaped cutting in a direction different from a ridge line direction of the prismatic ridges.

(6) The direct type back-light device according to the above, wherein each shape of the structural units is pyramidal or truncated pyramidal.

(7) The direct type back-light device according to the above, wherein
the light diffusion plate is made of a resin composition containing transparent resin and light diffusing agent, and
a total light transmittance of the resin composition is no less than 60% and no more than 98%.

(8) The direct type back-light device according to the above, wherein
the light diffusion plate is made of a resin composition containing transparent resin and light diffusing agent, and
a haze of the resin composition is no less than 20% and no more than 100%.

Further, the present invention includes the following preferable modes:

(9) The direct type back-light device according to the above, wherein the light diffusion plate is formed of transparent resin of which water absorption is no more than 0.25%.

(10) The direct type back-light device according to the above, wherein the light diffusing agent is polystyrene polymer, or polysiloxane polymer, or a crosslinked product thereof.

EFFECTS OF THE INVENTION

A direct type back-light device in the present invention has a high light-amount effective utilization ratio, and inhibits periodical unevenness in brightness on a light-emitting surface. Therefore, the direct type back-light device is thin, and can exhibit high brightness and good brightness uniformity.

EXPLANATION OF SYMBOLS

Figure 1:
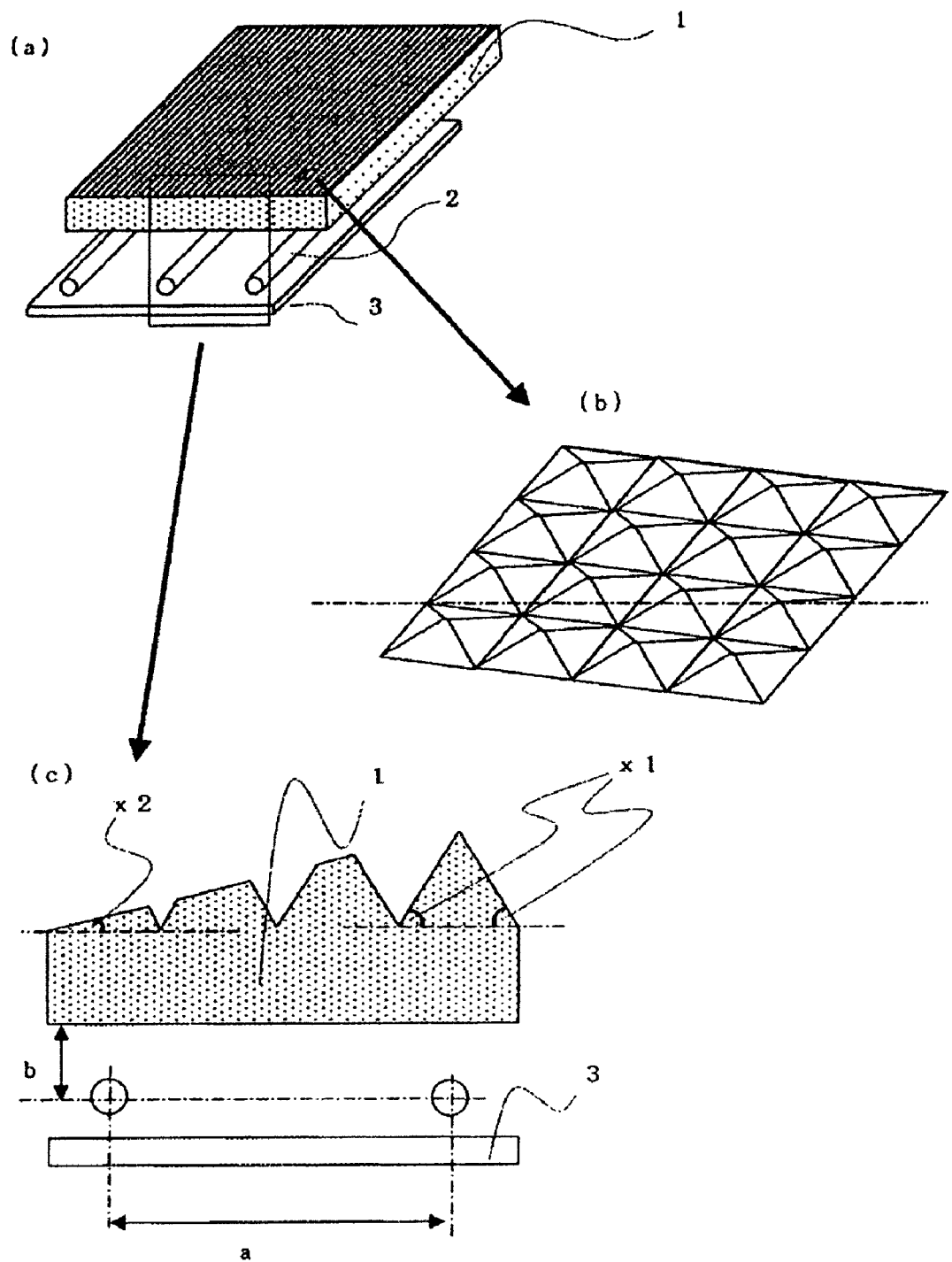
FIG. 1 is a perspective view of a direct type back-light device according to one embodiment in the present invention and partially enlarged views thereof.

1 Light diffusion plate
2 Linear light source
3 Reflection plate
X1, X2 Gradients of lines which represent sloped sides of structural unit
a Distance between central axes of linear light sources
b Distance between central axis of linear light source and light diffusion plate
4 Metallic member
5-1, 5-2 Tools used for cutting process
12 Point light source

BEST MODE FOR CARRYING OUT THE INVENTION

A direct type back-light device according to the present invention is configured such that a reflection plate, a plurality of linear light sources disposed in parallel or a plurality of point light sources disposed to be spaced apart, and a light diffusion plate are disposed in this order.

(Reflection Plate)

The reflection plate used in the present invention is not particularly limited, and may be any plate which can reflect light. For example, the reflection plate includes a white or silver colored resin plate, metal plate, or the like. A color of the reflection plate is preferably white in terms of improvement of brightness uniformity. To achieve a sophisticated balance between brightness and brightness uniformity, the reflection plate may include a white-colored portion and a silver-colored portion may be mixed. A material thereof may preferably be resin in terms of weight reduction.

(Linear Light Source)

The linear light source used in the present invention is not limited in particular, and may be any light source which has a linear light-emitting portion. In the present invention, the linear light source includes not only that of which shape of a light-emitting element itself is linear, such as a cold-cathode tube and a hot-cathode tube, but also includes that of which the shape can be viewed as the same as the linear light-emitting portion, or the like, which is configured such that light from a light source such as an LED or the like is guided by a light guide and the light is emitted from a linear light-emitting surface.

The cold-cathode tube or the hot-cathode tube may include not only a rectilinear light-emitting portion but also a curvilinear light-emitting portion. For example, the linear light source may be in a U-shaped such that two tubes arranged in parallel connected with approximately semicircle form one tube, an N-shape formed such that three tubes arranged in parallel are connected with two approximately semicircles to form one tube, or a W-shape formed such that four tubes arranged in parallel are connected with three approximately semicircles to form one tube.

It is preferable to use the cold-cathode tube as the linear light source in terms of brightness uniformity. Also it is preferable to use a linear light source configured to guide the light from the LED by the light guide and emit the light from the linear light-emitting surface in terms of color reproduction.

In the present invention, a plurality of linear light sources are disposed in parallel. That is, adjacent linear light-emitting portions are arrayed to be approximately in parallel. When the three or more linear light-emitting portions are arrayed, these are preferably spaced apart at regular intervals.

In the present invention, a distance $a_{Ln}$ between central axes of the adjacent linear light sources is not particularly limited, but is preferably no less than 15 mm and no more than 150 mm, and more preferably, no less than 20 mm and no more than 100 mm. When the distance $a_{Ln}$ between the central axes of the adjacent linear light sources is set to the above-described range, it becomes possible to reduce power consumption, to facilitate assembly of the back-light device, and to reduce brightness unevenness.

In the present invention, a distance $b_{Ln}$ between the central axis of the linear light source and a main surface facing the linear light source of the light diffusion plate may be designed in view of a thickness of the back-light device and the brightness uniformity. The distance $b_{Ln}$ preferably is no less than 2 mm and no more than 30 mm, and more preferably no less than 3 mm and no more than 25 mm. In the present invention, a distance $b_{Ln}$ of each linear light source preferably is approximately equal. When the distance $b_{Ln}$ is set to the described-above range, it becomes possible to reduce brightness unevenness and to prevent deteriorating of a light-emitting efficiency of a lamp. In addition, it becomes possible to make a thickness of a whole of the back-light device thin.

In the present invention, in terms of improving the brightness uniformity, the distance $a_L$ between the central axes of the adjacent linear light sources, and the distance $b_{Ln}$ between the central axis of the linear light source and the surface facing the light source of the light diffusion plate are generally constant values in the back-light device. However, to obtain a brightness distribution which resembles that of a cathode-ray tube in which a screen center portion is brighter, values of $a_{Ln}$ and $b_L$ may sometimes be set smaller near a center of the back-light device than in peripheral portions.

(Point Light Source)

The point light source used in the present invention is that which has a point-like light-emitting portion. A representative example of the point light source includes a light-emitting diode (LED). Some light-emitting diodes emit various colors such as white, red (R), green (G), blue (B), or the like. In the present invention, in terms of a color balance, it is possible to appropriately select and use, as the point light source: (1) that which uses only a white-colored LED; (2) that which combines RGB three primary colors; and (3) that which combines an intermediate color or a white color in the RGB three primary colors. The point light source may have an equivalent diameter of about several mm to more than a dozen mm.

Those ((2) and (3)) in which the RGB three primary colors are combined include: (A) that in which at least one of each of a red-colored LED, a green-colored LED, and a blue-colored LED is disposed adjacently and each color is mixed to emit a white color; and (B) that in which the red-colored LED, the green-colored LED, and the blue-colored LED are appropriately disposed and a field sequential method in which the LED of each color is emitted in a time division manner is used to perform a color display. In the case of (A), a combination of adjacently disposed LEDs is regarded as one point light source.

Figure 9:
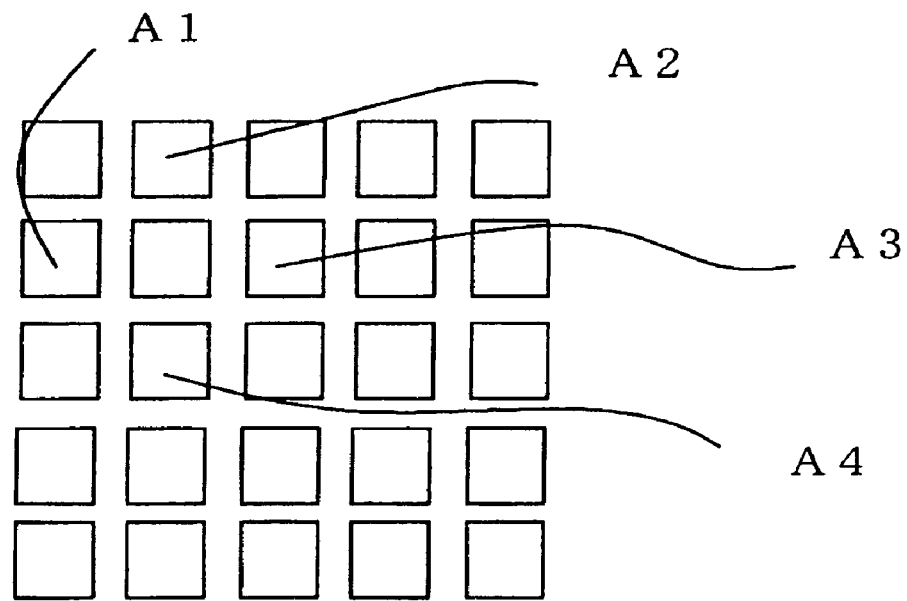
FIG. 9 is a plane view schematically showing an arrangement of a plurality of point light sources according to a first mode.
Figure 10:
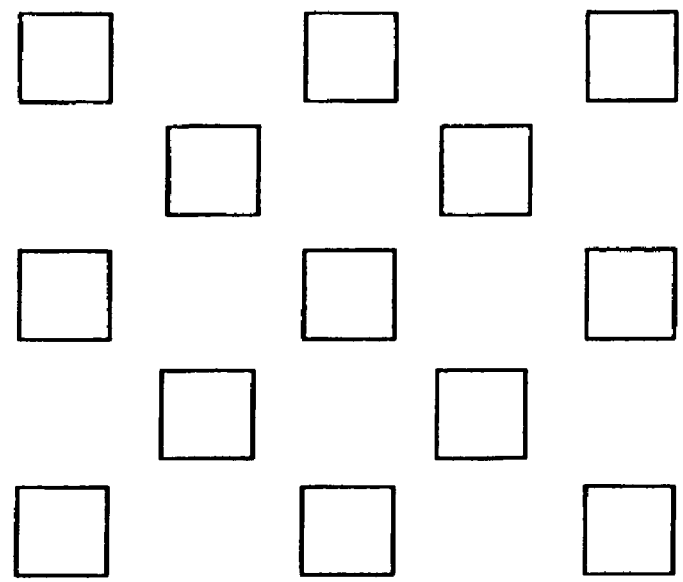
FIG. 10 is a plane view schematically showing an arrangement of a plurality of point light sources according to a second mode.
Figure 11:
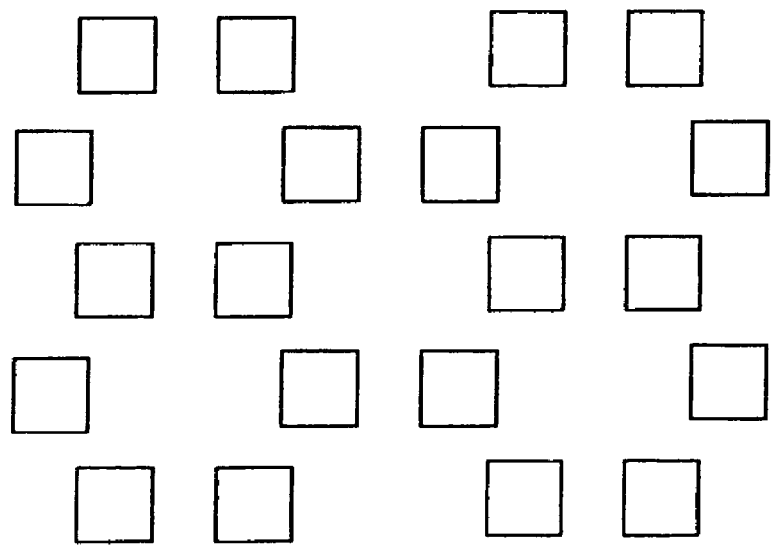
FIG. 11 is a plane view schematically showing an arrangement of a plurality of point light sources according to a third mode.

In the present invention, the point light sources are disposed to be spaced apart. A disposing mode of the point light sources is not particularly limited. Examples of the disposing mode of the point light sources include: a disposing mode in which the point light sources are linearly disposed on a straight line; that in which the point light sources are disposed with predetermined intervals along vertical and horizontal directions of the direct type back-light device, as shown in FIG. 9; that in which point light sources A1 to A4 in FIG. 9 are removed, i.e., point light sources 12 are disposed at respective four apexes of a rectangle and the point light sources 12 are further disposed on intersections of diagonal lines of the rectangle, as shown in FIG. 10; that in which the point light sources 12 are disposed at respective apexes of a honeycomb structure in which equilateral hexagons are formed in succession, as shown in FIG. 11.

In these modes, the intervals among the point light sources may be uniform in all locations, and may vary in some locations. When the intervals vary in some locations, this means a case where the intervals among the point light sources become narrow in a central location of the direct type back-light device, for example.

The adjacent point light sources used herein refer to two point light sources in a state where on a line connecting centers of the two point light sources, there are no other point light source on the line.

In the case of (A) in which the RGB three primary colors are combined, based on the center of each LED disposed adjacently, a center of point light sources regarded as one is specified, and based on the center, a distance $a_{Pn}$ between the adjacent point light sources is evaluated.

In the case of a configuration of (B) in which the RGB three primary colors are combined, a distance $a_{Pn}$ of each color is evaluated by each colored LED according to the above-described definition, and an average value thereof is used as the distance $a_{Pn}$ between the adjacent point light sources defined in the present invention.

In the present invention, the distance $a_{Pn}$ between the centers of the adjacent point light sources is not particularly limited. However, out of the distances $a_{Pn}$ between the centers of the adjacent point light sources, four shortest distances $a_{Pn}$ are selected, and an average value of the four distances $a_{Pn}$ preferably is no less than 10 mm and no more than 200 mm, and more preferably no less than 15 mm and no more than 150 mm. When the average value is set to the above-described range, it becomes possible to reduce power consumption, to facilitate the assembly of the back-light device, and to reduce the brightness unevenness.

In the present invention, a distance $b_{Pn}$ between the center of the point light source and a main surface facing the point light source of the light diffusion plate may also be designed in terms of the thickness of the back-light device and the brightness uniformity. The distance $b_{Pn}$ preferably is no less than 2 mm and no more than 100 mm, and more preferably no less than 3 mm and no more than 80 mm.

When the distance $b_{Pn}$ is set to the above-described range, it becomes possible to reduce the brightness unevenness and to prevent a display quality deterioration of the display resulting from a heat of the LED. Further, it becomes possible to make the thickness of the back-light device thin.

In the present invention, in terms of improving the brightness uniformity, both the distance $a_{Pn}$ between the centers of the adjacent point light sources and the distance $b_{Pn}$ between the center of the point light source and the surface facing the light source of the light diffusion plate are generally constant values in the back-light device. However, to obtain a brightness distribution which resembles that of a cathode-ray tube, in which a screen center portion is brighter, the values of the distance $a_{Pn}$ and $b_{Pn}$ may be set smaller in areas near the center of the back-light device than in peripheral portions.

(Light Diffusion Plate)

The light diffusion plate used in the present invention is a plate for diffusing an advancing direction of an incident light and emitting light of a uniform brightness from a main surface (plate surface). The light diffusion plate has a light incident surface and a light emitting surface (in the present invention, these surfaces may be each referred to as a main surface). Light from the linear light source or the point light source is incident on the light incident surface located to face the light source. The light incident on the light incident surface of the light diffusion plate is diffused in various direction inside the light diffusion plate or by a plurality of structural units arranged regularly on at least one of the light incident surface and the light emitting surface. The diffused light emits from the light emitting surface opposite the linear light source.

The light diffusion plate used in the present invention is formed on at least one main surface with concave or convex structural units. The units each have three or more sloped sides. The structural units may be provided on a whole of the main surface, and may be provided only on an optically effective surface of the main surface.

The structural units may be formed on both main surfaces of the light diffusion plate. However, it is preferable that the structural units be formed only on the main surface (light emitting surface) opposite the linear light source because in this way the brightness can be further improved. The light incident on the incident surface of the light diffusion plate is refracted in a specific direction by the structural units and is diffused and irradiated from the light emitting surface.

Each of the structural units is in a convex or concave shape having three or more sloped sides. Each of the structural units preferably is in a convex or concave shape which can narrow down an emitting direction of the light. Examples of specific shapes of the structural units include: a pyramidal convex shape or a concave shape obtained by transcribing the pyramidal convex shape; a truncated pyramidal convex shape or a concave shape obtained by transcribing the truncated pyramidal convex shape; a convex shape obtained by applying a V-shaped cut to ridges of semicylindrical lenticular lenses or prismatic ridges having a sawtooth-shaped cross-section in a direction different from a ridge-line direction of these ridges or a concave shape obtained by transcribing those shapes. Examples of pyramids include a trigonal pyramid, a tetragonal pyramid, a pentagonal pyramid and a hexagonal pyramid, and examples of truncated pyramids include a truncated trigonal pyramid, a truncated tetragonal pyramid, a truncated pentagonal pyramid and a truncated hexagonal pyramid.

Out of those convex or concave shapes, it is preferable to use the convex shape obtained by applying the V-shaped cut to the prismatic ridges having a sawtooth-shaped cross-section in the direction different from the ridge-line direction of the ridges or the concave shape obtained by transcribing this convex shape because with these shapes, the formation of the structural units becomes easy.

The prismatic ridges having a sawtooth-shaped cross-section refer to a shape formed such that triangular or trapezoidal protrusions range in a cross-section cut along a direction perpendicular to the longitudinal direction. The prismatic ridges having a sawtooth-shaped cross-section may be configured to form V-shaped grooves obtained by linking skirts of the triangular protrusions, or to permit existence of horizontal portions between the gaps of the triangular protrusions. It is preferable to use the shape in which the skirts of the triangles are linked to form the V-shaped grooves because light can be more effectively diffused. The shape of the triangular protrusions is not particularly limited. However, to make brightness in a front-side direction of a liquid crystal display highest, an isosceles triangle shape is preferable.

The structural units are preferably formed only of the concave shape or the convex shape because with these shapes, it is easy to manufacture a mold for the formation. Further, the structural units may be formed of one type of convex or concave shape, or of a combination of a plurality of types of convex or concave shapes.

In the present invention, it is preferable that the structural units or a group of structural units are repeatedly arrayed periodically to improve the brightness uniformity.

The period preferably is no less than 20 μm and no more than 700 μm, and more preferably, no less than 40 μm and no more than 400 μm. When the period of the structural units is less than the range, it may probably become difficult to form the structural units or decrease the light diffusion effect. When the period exceeds the range, the light diffusion becomes rough and as a result, brightness unevenness may probably occur.

In the light diffusion plate used in the present invention, a maximum height Rz of the main surface having the structural units is no more than 1000 μm.

When the maximum height Rz exceeds 1000 μm, processing becomes difficult, and thus, it becomes difficult to uniformly form the concave or convex structural units, and as a result, the brightness uniformity is deteriorated. To further improve a balance between the brightness and the brightness uniformity in the back-light device and to further facilitate the processing of the light diffusion plate, the maximum height Rz of the main surface having the structural units is preferably no less than 2 μm and no more than 1000 μm; more preferably, no less than 4 μm and no more than 800 μm; and still more preferably, no less than 8 μm and no more than 500 μm. According to JIS B0601, the maximum height Rz of the main surface having the structural units is evaluated of the main surface having the structural units by using an ultra-deep shape measurement microscope.

In the present invention, the sloped side of the structural units of the light diffusion plate may be smooth, but a part or a whole of the slope side surface may be rough. All the sloped sides which configure the structural units may be rough, and only some sloped sides may be rough. When the sloped side has an appropriate rough surface, the emitting direction of light can be made more diverse within an appropriate range. In the light diffusion plate of which sloped side of the structural units is rendered rough, an arithmetic average height Ra, which is obtained by measuring 20 μm in a direction at right angles relative to a side parallel to the main surface of the light diffusion plate on the sloped side, is preferably no less than 0.08 μm and no more than 3 μm, and more preferably no less than 0.09 μm and no more than 2 μm, and particularly preferably no less than 0.1 μm and no more than 1 μm. When Ra of the sloped side is rendered no less than 0.08 μm, the emitting direction of light can be more diverse, and when it is rendered no more than 3 μm, the emitting direction of light can be made not too diverse. The arithmetic average height Ra is evaluated of the sloped side of the structural units by using an ultra-deep shape measurement microscope according to JIS B0601.

The light diffusion plate used in the present invention is not particularly limited by a material from which the same is configured and a method therefor.

The material which configures the light diffusion plate is not particularly limited, but used generally are: glass; a mixture of two or more resins which do not tend to be uniformly mixed; a resin composition in which light diffusing agent is dispersed in a transparent resin; one transparent resin, or the like. Out of these materials, the resin is preferable because it is light and easy to form. Further, because of easiness of improving the brightness, one transparent resin is preferably used for the material. Because of a total light transmittance and easy adjustment of a haze, the resin composition formed by dispersing the light diffusing agent into the transparent resin is preferable.

A portion of the concave or convex structural units may be formed of a material different from that of a substrate of the light diffusion plate, but is preferably formed of the same material, in particular, formed of the resin composition in which the light diffusing agent is dispersed in the transparent resin because it is possible to adjust a whole of the light diffusion plate to the same total light transmittance and haze, and further, possible to make directions of light which emits from the light diffusion plate more diverse.

In the present invention, the transparent resin is that which has a total light transmittance of no less than 70% when a 2 mm-thick plate having smooth surfaces on both sides is measured according to JIS K7361-1. Examples of the transparent resin include: polyethylene; propylene-ethylene copolymer; polypropylene; polystyrene; copolymer of aromatic vinyl monomer and (meth)acrylic acid alkyl ester having a lower alkyl group; polyethylene terephthalate; copolymer of terephthalic acid, ethylene glycol and cyclohexanedimethanol; polycarbonate; acrylic resin; metacrylic resin; and resin having an alicyclic structure. Out of these, polycarbonate, polystyrene, copolymer of an aromatic vinyl monomer in an amount of no less than 10% and a (meth)acrylic acid alkyl ester having a lower alkyl group, or the resin having an alicyclic structure is preferable. Further, a transparent resin having a water absorption of no more than 0.25% is preferable because it is unlikely to suffer from deformation resulting from moisture absorption, and hence can produce a large light diffusion plate with only a small amount of warpage.

Out of these, the resin having an alicyclic structure is particularly preferable because it has excellent fluidity and can effectively produce a large light diffusion plate. A compound in which the resin having an alicyclic structure and the light diffusing agent are mixed combines a high transmittance and a high diffusion property, both of which are required for the light diffusion plate, and has good chromaticity as well. Thus, such compound can be preferably used. It is noted that the (meth)acrylic acid means acrylic acid and methacrylic acid.

The resin having an alicyclic structure is that which has an alicyclic structure in its main chain and/or its side chain. In terms of mechanical strength, heat resistance, or the like, a resin having an alicyclic structure in the main chain is particularly preferable.

Examples of the alicyclic structure include a saturated cyclic hydrocarbon (cycloalkane) structure, and an unsaturated cyclic hydrocarbon (cycloalkene, cycloalkyne) structure. In terms of mechanical strength, heat resistance, or the like, the cycloalkane structure and the cycloalkene structure are preferable, and in particular, the cycloalkane structure is most preferable. Although there is no particular limitation to the number of carbon atoms which configure the alicyclic structure, the number of carbon atoms generally from 4 to 30, preferably from 5 to 20, and more preferably from 5 to 15, is advantageous in terms of highly balancing the resin properties of mechanical strength, heat resistance, and formability for the light diffusion plate.

A proportion of repeating units having an alicyclic structure in the resin having an alicyclic structure may be appropriately selected according to the use of resin, but it is usually no less than 50% by weight, preferably no less than 70% by weight, and still more preferably no less than 90% by weight. When the proportion of the repeating units having an alicyclic structure is too small, the heat resistance decreases, and therefore, not preferable. Repeating units other than those having an alicyclic structure in the resin having an alicyclic structure are appropriately selected according to the use of resin.

Specific examples of the resin having an alicyclic structure include: (1) a norbornene polymers such as a ring-opening polymer of a norbornene monomer, a ring-opening copolymer of a norbornene monomer and another monomer ring-opening copolymerizable with the norbornene monomer and hydrogenated products thereof, and an addition polymer of a norbornene monomer, an addition copolymer of a norbornene monomer and another monomer copolymerizable with the norbornene monomer or the like; (2) a monocyclic cycloolefin polymer and a hydrogenated product thereof; (3) polymer with a cyclic conjugated diene and a hydrogenated product thereof: and (4) a vinyl alicyclic hydrocarbon polymers such as a polymer of a vinyl alicyclic hydrocarbon monomer, a copolymer of a vinyl alicyclic hydrocarbon monomer and another monomer copolymerizable with the vinyl alicyclic hydrocarbon monomer and hydrogenated products thereof, and an aromatic ring-hydrogenated product of a polymer of a vinyl aromatic monomer, and an aromatic ring-hydrogenated product of a copolymer of a vinyl aromatic monomer and another monomer copolymerizable with the vinyl aromatic monomer, or the like. Out of these, in terms of heat resistance, mechanical strength, or the like, the norbornene polymers and the vinyl alicyclic hydrocarbon polymers are preferable, and a hydrogenated product of a ring-opening polymer of the norbornene monomer, a hydrogenated product of a ring-opening copolymer of a norbornene monomer and another monomer ring-opening copolymerizable with the norbornene monomer, an aromatic ring-hydrogenated product of a polymer of the vinyl aromatic monomer, and an aromatic ring-hydrogenated product of a copolymer of a vinyl aromatic monomer and another monomer copolymerizable with the vinyl aromatic monomer are more preferable.

The light diffusing agent used for the light diffusion plate is made of particles having a property for diffusing a light beam. The light diffusing agent can be classified into inorganic light diffusing agent and organic light diffusing agent. Examples of an inorganic substance which configures the inorganic light diffusing agent include: silica; aluminum hydroxide; aluminum oxide; titanium oxide; zinc oxide; barium sulfate; magnesium silicate; or a mixture thereof. Examples of an organic substance which configures the organic light diffusing agent include: acrylic resins; acrylonitrile; polyurethane; polyvinyl chloride; polystyrene resins; polyacrylonitrile; polyamide; polysiloxane resins; melamine resins; and benzoguanamine resins. Out of these, microparticles made of polystyrene resins, polysiloxane resins, or a crosslinked product thereof can be particularly preferably used because it has high diffusion property, high heat resistance, and is unlikely suffer from discoloration (yellowing) during the molding. The microparticles made of a crosslinked product of polysiloxane resins can be further preferably used because it has further favorable heat resistance.

Although there is no particular limitation to a shape of the particles of the light diffusing agent used for the light diffusion plate, but the particles thereof may be: spherical, cubic, needle-shaped, rod-shaped, spindle-shaped, plate-shaped, scale-shaped, fiber-shaped, or the like. Out of these, a preferable shape is spherical which is capable of realizing isotropic diffusing direction of light.

The light diffusing agent is used as being contained in the transparent resin, and being microscopically uniformly and separately dispersed.

A content of the light diffusing agent in the resin composition in which the light diffusing agent is dispersed in the transparent resin is not particularly limited, and appropriately selectable according to the thickness of the light diffusion plate, light source intervals, or the like. However, generally, it is preferable that the content of the light diffusing agent be adjusted such that the total light transmittance of the resin composition is no less than 60% and no more than 98%, and it is more preferable that the content of the light diffusing agent be adjusted such that the total light transmittance is no less than 65% and no more than 95%. Further, it is preferable that the content of the light diffusing agent be adjusted such that the haze is no less than 20% and no more than 100%, and it is more preferable that the content of the light diffusing agent be adjusted such that the haze is no less than 25% and no more than 100%. When the total light transmittance is no less than 60% and the haze is no more than 100%, the brightness can be further improved. When the total light transmittance is no more than 98% and the haze is no less than 20%, the brightness uniformity can be further improved.

The value of the total light transmittance is obtained by measuring a 2 mm-thick plate having smooth surfaces on both sides according to JIS K7361-1, and that of the haze is obtained by measuring a 2 mm-thick plate having smooth surfaces on both sides according to JIS K7136.

The thickness of the light diffusion plate is not particularly limited, but it is preferably 0.4 mm to 5 mm, and more preferably 0.8 mm to 4 mm. When the thickness is smaller than 0.4 mm, a devise for inhibiting deflection resulting from its own weight, such as formation of a great number of pillars in the back-light device, becomes necessary. Thus, the structure of the back-light device becomes complicated. When the thickness exceeds 5 mm, the molding becomes difficult.

A method of forming the structural units on the surface of the light diffusion plate is not particularly limited. A method of forming the structural units on a flat-plate-like light-diffusion-plate surface may be possible, and a method of forming the structural units at the same time that a light diffusion plate substrate is formed may be possible, for example.

Examples of a method of forming the structural units on the flat-plate-like light-diffusion-plate surface include: a method in which the flat-plate-like light-diffusion-plate surface is cut and processed; a method in which the flat-plate-like light-diffusion-plate surface is coated with a photocurable resin or a thermosetting resin, a desired shape is transcribed to the resultant coating by a roll or a mold, and in this state, the coating is cured; an embossing method in which the flat-plate-like light-diffusion-plate surface is pressed by a roll or a mold having a desired shape.

Examples of the method of forming the structural units at the same time that the light-diffusion-plate substrate is formed include: a casting method in which a casting mold capable of forming a desired structural unit shape is used; and an injection molding method in which a metal mold capable of forming the desired structural unit shape is used.

As described above, in the injection molding method and the casting method, the structural units can be formed at the same time that the light-diffusion-plate substrate is formed. Thus, the step is simple.

In the casting method, it can be formed inside of a mold for forming a plate, or it can also be performed continuously by injecting the raw material between two continuous belts while moving the two belts.

In the injection molding method, to enhance a feature replication rate, it is preferable that a mold temperature at the time of resin injection be increased and the mold be rapidly cooled at the time of cooling. Further, it is also preferable that an injection compression molding method in which a mold is opened at the time of resin injection and the mold is thereafter closed can be applied.

With the embossing method, an in-plane feature replication rate can be rendered uniform. A plate obtained by an extrusion molding can be sent directly to an embossing step to continuously perform the formation.

A mold-feature replication method in which the photocurable resin or the thermosetting resin is employed can enlarge the feature replication rate. In this method, it is preferable that the photocurable resin or the thermosetting resin be firstly cured to the extent such that the resin does not flow before the feature replication, light be irradiated at the same time as or immediately after the feature replication or heat be added, whereby the curing is completed. The mold-feature replication method may be directly applied to a flat plate created by the injection molding method, the extrusion molding method, or the casting method. However, it is more preferable to use a method in which the mold-feature replication method is applied to a thin film to obtain a film which is formed to a desired shape, and the resultant film is laminated to the flat plate created by the injection molding method, the extrusion molding method, or the casting method because in this method, a higher feature replication rate can be obtained.

The mold used in the mold-feature replication method in which the photocurable resin or the thermosetting resin is used, the embossing method, the casting method, or the injection molding method can be obtained by cutting processing or electrocasting processing capable of forming a minute shape.

The cutting processing for obtaining the mold is described in detail below. For example, the processing includes the following steps.

Figure 2:
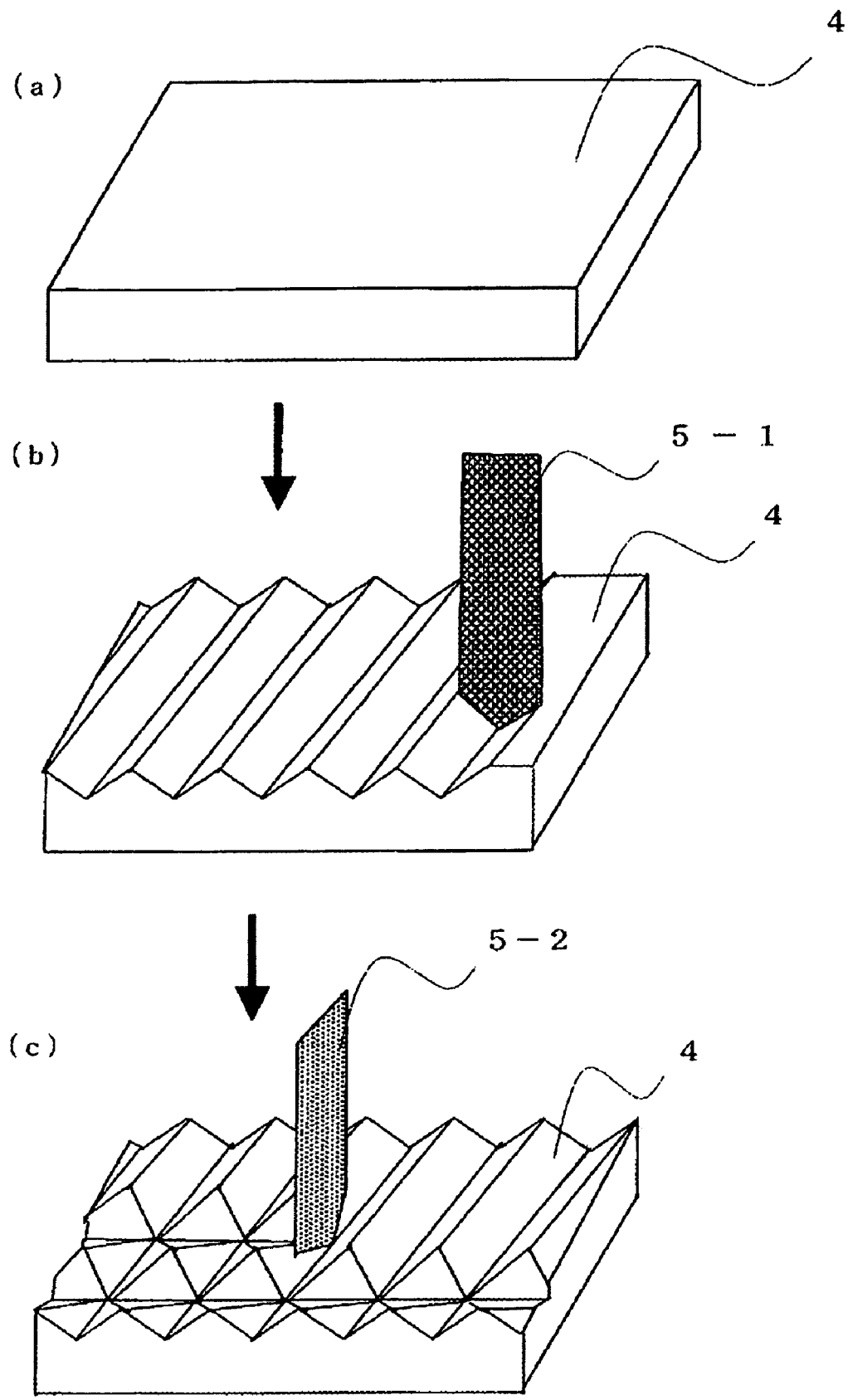
FIG. 2 shows one example of a method of processing a metallic member used in a mold in the present invention.

Firstly, a plate-like member 4 as shown in FIG. 2(*a*) is prepared.

Subsequently, as shown in FIG. 2(*b*), a tool 5-1 capable of forming prismatic ridges having a sawtooth-shaped cross-section are firstly used to cut and process the prismatic ridges in a single direction on the member;

This is followed by FIG. 2(*c*) in which a tool 5-2 capable of forming a V-shaped cutting is used to cut and process in a direction different from a ridge line direction of the prismatic ridges. The tool 5-2 may be capable of forming a slope the same in angle as that of the tool 5-1, and may be capable of forming a different angle.

Figure 3:
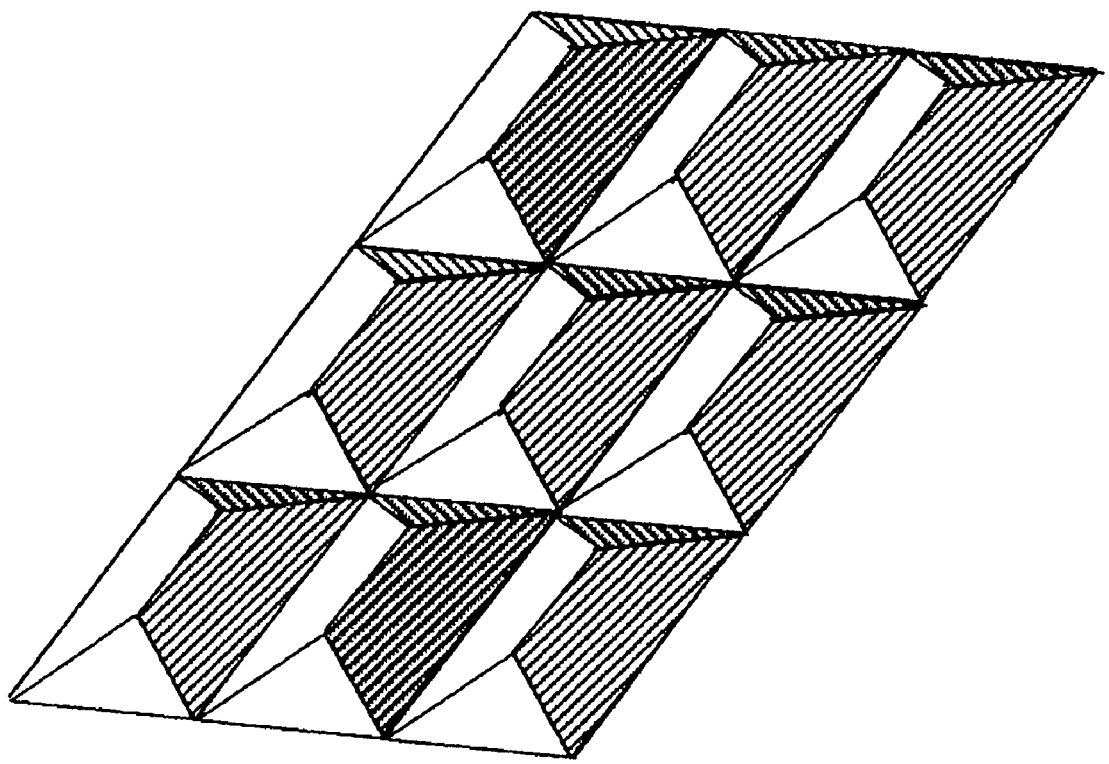
FIG. 3 is a perspective view of one example in which convex structural units each having three or more sloped sides are arrayed regularly, in the present invention.

At this time, heights of the prismatic ridges and those of the V-shaped cutting are rendered the same to device pitches. As a result, tetragonal pyramids can be formed. When the pitches are largely formed, a roof-like shape (shape as shown in FIG. 3) may be formed.

As required, a further cutting processing may also be applied in a different direction. When a tool of which average gradient of right and left wings of the V shape differs is used in at least one of the above-described cutting processings, two types of average gradients of sides of the structural unit can be obtained. Even when a tool of which average gradient of right and left wings of the V shape is the same is used, it is still possible to obtain the two types of average gradients of sides of the structural unit if at least one cutting direction is adapted to differ to a longitudinal direction of the light diffusion plate or to a shorter direction thereof.

In the case of a roll, a similar cutting processing may be applied to a metal roll. Alternatively, a stamper is obtained by the above-described cutting processing, and the stamper may be affixed to the metal roll.

In the direct type back-light device in the present invention, when the linear light source is used, a vertical cross section of the light diffusion plate, which lies immediately above a region between the central axes of the adjacent linear light sources and in which a direction perpendicular to a central axis direction of the linear light source is defined as a cutting-plane line, includes: a portion (1) in which there are no less than 2 lines showing the differing sloped sides n having the gradients Xn (unit:degree, where n is a natural number and a subindex for representing each sloped side), and (2) in which all the gradients Xn have, between an average distance $a_L$(mm) between the central axes of the adjacent linear light sources and a minimum distance $b_L$(mm) between the central axis of the linear light source and a main surface facing the linear light source in the light diffusion plate, a relationship L1 of $12.5-10\times(b_L/a_L)<Xn<85-25\times(b_L/a_L))$, preferably a relationship L2 of $15-10\times(b_L/a_L)<Xn<80-25\times(b_L/a_L)$.

In the direct type back-light device in the present invention, when the point light source is used, at least one of vertical cross sections of the light diffusion plate, which lie immediately above a region which is surrounded by the three adjacent point light sources and which does not include other point light sources and which define a direction perpendicular to a direction which links the centers of the two point light sources, out of the three point light sources, as a cutting-plane line, includes: a portion (1) in which there are no less than 2 lines showing the differing sloped sides n of the gradients Xn (unit:degree, where n is a natural number and a subindex for representing each sloped side), and (2) in which all the gradients Xn have, between an average distance $a_P$(mm) among the centers of the three adjacent point light sources and a minimum distance $b_P$(mm) between the center of the point light source and a main surface facing the linear light source in the light diffusion plate, a relationship P1 of $12.5-11\times(b_P/a_P)<Xn<85-28.5\times(b_P/a_P)$.

In the direct type back-light device in the present invention, there are no less than 2 types of the gradients of the line which represents the sloped sides n. A difference between the gradients is not particularly limited, but generally, the angle thereof has a difference of no less than 2 degrees.

In the region immediately above the region between the central axes of the adjacent linear light sources, a ratio of the portion having the relationship L1, preferably the relationship L2, is preferably no less than 50%, more preferably no less than 60%, and particularly preferably no less than 70%.

In the region immediately above a region which width is same as a diameter of the point light source between the two point light sources placed adjacently by a minimum distance, a ratio of the portion having the relationship P1, [preferably the relationship P2,] is preferably is no less than 50%, more preferably is no less than 60%, and particularly preferably is no less than 70%.

When the portion having such relationship is included, it becomes possible to obtain a back-light device which exhibits a higher brightness and excels in brightness uniformity.

A method for including the portion having the above-described relationship is not particularly limited. Examples thereof include: a method for forming the concave or convex structural unit in an asymmetric polyangular pyramid; and a method in which a regularly disposed direction of the structural units and a direction of the central axis of the linear light source or a direction in which the centers of the two point light source placed adjacently by a minimum distance are linked are disposed to intersect at an angle which is neither right nor parallel. In the present invention, the latter method is preferable.

With respect to the gradients Xn, the main surface having the structural units is directly observed using an ultra-deep shape measurement microscope, and the gradients Xn are an inferior angle of an intersection between a line at right angles to a normal line of the light diffusion plate and a line representing the sloped sides n.

For example, in FIG. 1(c), a line at right angles to the normal line of the light diffusion plate is represented in a dashed line, and a line which represents the sloped side is a solid line drawn above the dashed line. A sloped side (solid line which ascends toward right) on a left side of a leftmost triangle has a gradient of X2, and a sloped side on a right side (solid line which descends toward left) has a gradient of X1. Also a solid line which indicates a top section of a second or third polygon from a left end is a line which represents a sloped side. In FIG. 1(c), a gradient of the solid line is X1.

In the present invention, the sloped side of the structural unit includes not only that formed by one plane but also that formed by a curved surface. When the sloped side is the curved surface, the gradients Xn represent a value obtained by averaging gradients of tangents of the curved surface.

In the direct type back-light device in the present invention, for an optical member for further improving the brightness and the brightness uniformity, a diffusion sheet and/or a prism sheet may be disposed opposite to the light source of the light diffusion plate. To further improve the brightness, a reflection-type polarizer may be disposed opposite to the light source of the optical member.

Examples of the reflection-type polarizer include: a reflection-type polarizer which utilizes a difference in reflection coefficient of a polarization component based on a Brewster's angle (for example, that disclosed in JP-T-06-508449); a reflection-type polarizer which utilizes a selective reflection property by a cholesteric liquid crystal, more specifically, a laminate of a film made of the cholesteric liquid crystal and a ¼ wavelength plate (for example, that disclosed in JP-A-03-045906); a reflection-type polarizer to which a minute metallic linear pattern is applied (for example, that disclosed in JP-A-02-308106); a reflection-type polarizer in which at least two types of polymer films are laminated and which utilizes anisotropy in reflection coefficient resulting from anisotropic refractive index (for example, that disclosed in JP-T-09-506837); a reflection-type polarizer which has a sea-island structure formed by at least two types of polymers in a polymeric film and which utilizes anisotropy in reflection coefficient resulting from anisotropic refractive index (for example, that disclosed in U.S. Pat. No. 5,825,543); a reflection-type polarizer in which particles are dispersed in a polymer film and which utilizes anisotropy in refractive index resulting from anisotropic refractive index (for example, that disclosed in JP-T-11-509014): and a reflection-type polarizer in which inorganic particles are dispersed in a polymer film and which utilizes anisotropy in refractive index based on a difference in diffusing ability depending on particle sizes (for example, that disclosed in JP-A-09-297204).

Embodiments of the present invention are described with reference to drawings.

First Embodiment

FIG. 1(a) is a schematic perspective view showing one example of a direct type back-light device according to a first embodiment of the present invention. The direct type back-light device of the embodiment is provided with: a plurality of linear light sources 2 disposed in parallel; a reflection plate 3 which reflects light of the linear light sources 2; and a light diffusion plate 1 which receives light incident to a light incident surface and diffuses and irradiates the light from a light emitting surface, which is a surface on an opposite side of the light incident surface.

FIG. 1(b) shows one example of the light diffusion plate 1 of which convex structural units (tetragonal pyramid) are regularly arrayed on light emitting surface. As shown in FIG. 1(b), the convex structural unit of the light diffusion plate used in the embodiment has three or more sloped sides (in FIG. 1, the structural unit is formed in a tetragonal pyramid). A dashed line indicating a direction at right angles to a direction of the central axis of the linear light source and an arraying direction of the structural unit of the light diffusion plate (which corresponds a bottom side of the tetragonal pyramid in FIG. 1) are in a state neither at right angles nor in parallel to each other.

FIG. 1(c) is a diagram showing a vertical cross section of the reflection plate 3, the linear light source, and the light diffusion plate shown in FIG. 1(a), where a direction perpendicular to a longitudinal direction of the linear light source is a cutting-plane line (dashed line in the figure). A portion represented by a square on a bottom side of FIG. 1(c) is the reflection plate; two circles above the reflection plate are linear light sources; and a portion formed by arraying polygons is the light diffusion plate. In a region of the light diffusion plate immediately above a region between the two circles, four polygons (structural units) are included. As shown in FIG. 1(c), the sloped sides of the convex structural units are formed in a single plane in the embodiment, and thus, the gradients Xn of a line which represents each of sloped sides n of the convex structural unit are represented by an inferior angle formed by a line which represents each of sloped sides n of each convex structural unit and a line which links lowest portions of concave portions formed between the convex structural units. In the embodiment shown in FIG. 1(c), average gradients of the sloped sides, other than an average gradient of the sloped side on the leftmost side, are the same. Thus, these gradients are grouped together and represented by X1, and therefore, two types of average gradients, i.e., X1 and X2, are represented for the sake of simplicity.

In the embodiment, as shown in X1 in FIG. 1(c), the gradient which either rises toward right or toward left may be regarded as the same type as long as the angle has the same value.

In the first embodiment, between an average distance $a_L$ (mm) between the central axes of the adjacent linear light sources and a minimum distance $b_L$ (mm) between the central axis of the linear light source and the main surface facing the linear light source in the light diffusion plate, all the gradients Xn satisfy a relationship of $12.5-10\times(b_L/a_L)<Xn<85-25\times(b_L/a_L)$ (in FIG. 1, "a" denotes the average distance $a_L$ and "b" denotes the minimum distance $b_L$). The maximum height Rz of the light emitting surface of the light diffusion plate is no more than 1000 μm.

Second Embodiment

Figure 8:
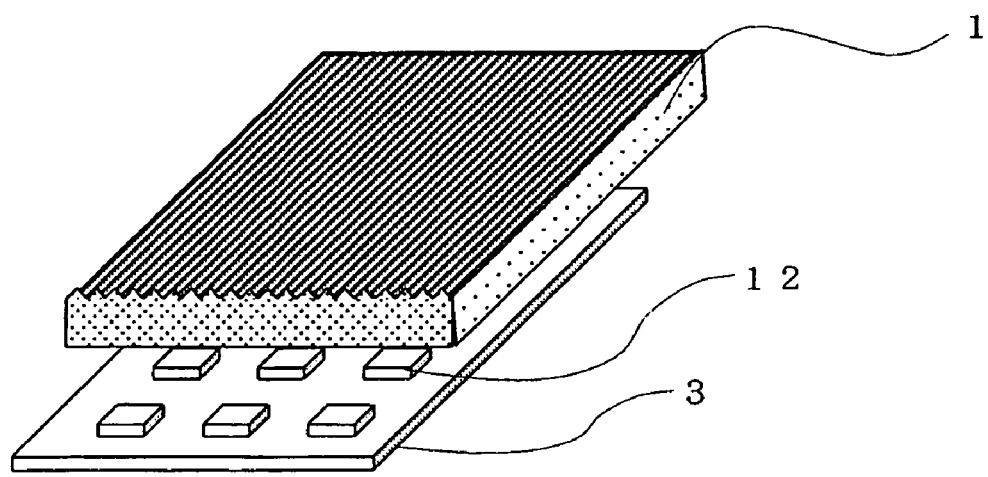
FIG. 8 is a perspective view schematically showing a direct type back-light device according to a second embodiment of the present invention.

FIG. 8 is a perspective view schematically showing a direct type back-light device according to a second embodiment. As shown in FIG. 8, the direct type back-light device of the second embodiment is configured to include a plurality of point light sources 12 and the light diffusion plate 1. The direct type back-light device according to the second embodiment is configured such that the plurality of linear light sources 2 disposed in parallel in FIG. 1(a) are replaced by the plurality of point light sources 12 disposed to be spaced apart.

The direct type back-light device of the second embodiment differs from the first embodiment in that the light source is the point light source and a preferable range of the average gradient Xn differs from that in the first embodiment.

In the second embodiment, between a distance $a_P$ (mm) between the point light sources placed adjacently in the shortest distance and a minimum distance $b_P$ (mm) between the center of the point light source and a main surface facing the point light source in the light diffusion plate, all the gradients Xn (unit:degree, where n is a natural number and is a subindex for representing each sloped side) satisfy a relationship of $12.5-11\times(b_P/a_P)<Xn<85-28.5\times(b_P/a_P)$. The maximum height Rz of the light emitting surface of the light diffusion plate is no more than 1000 μm.

EXAMPLES

Hereinafter, the present invention is described in more detail with reference to examples. However, the present invention is not limited to the examples at all. It is note that parts and % (percentages) are by weight, unless otherwise specified.

Manufacturing Example 1

Pellets 1 for the Light Diffusing Plate 99.9 parts of a resin having an alicyclic structure (ZEONOR1060R by ZEON CORPORATION, water absorption 0.01%) as a transparent resin, and 0.1 part of microparticles which had a mean particle diameter of 2 μm and which were comprised of a cross-linked product of polysiloxane polymer as light diffusing agent were mixed and, kneaded and extruded to be in a strand form by a twin-screw extruder, and cut by a pelletizer to manufacture pellets 1 for light diffusion plate. With these pellets for the light diffusion plate, a 2 mm-thick test plate, having smooth surfaces on both sides and a size of 100 mm×50 mm, was molded using an injection molder (mold clamping force 1000 kN). The total light transmittance and the haze of this test plate were measured in accordance with JIS K7361-1 and JIS K7136 using an integrating sphere type color-difference/turbidity measuring instrument. The total light transmittance was 94% and the haze was 89%.

Manufacturing Example 2

Pellets 2 for the Light Diffusing Plate

Pellets 2 for the light diffusing plates were manufactured by the same manner as the manufacturing example 1 except that the resin having an alicyclic structure and microparticles comprised of a crosslinked product of polysiloxane polymer were mixed at a proportion of 99.7 parts and 0.3 part, respectively. The total light transmittance of the pellets for the light diffusion plate was 85% and the haze thereof was 99%.

Manufacturing Example 3

Stamper 1

A whole surface of a stainless steel SUS430 of 387 mm×308 mm in dimension and of 2 mm in thickness was electroless-nickel-phosphorous-plated to a thickness of 100 μm. A diamond cutting tool of which apex angle was 90 degrees was used to cut and machine in a direction sloped by 30 degrees relative to a side of 387 mm in length (longitudinal side) on the resultant nickel-phosphorous electroless plating surface, thereby creating thereon protrusions of prismatic ridges having a sawtooth-shaped cross-section of 70 μm in width, 35 μm in height, 70 μm in pitch, and 90 degrees in apex angle. The prismatic ridges were further cut and machined in a perpendicular direction for forming such that apexes of prismatic ridges, having a sawtooth-shaped cross-section, of 70 μm in width, 35 μm in height, 70 μm in pitch, and 90 degrees in apex angle coincided with those of the prismatic ridges, whereby a stamper 1 was obtained. The resultant stamper 1 had a convex shape formed by periodically repeating tetragonal pyramids of 70 μm in side on its square bottom surface and 35 μm in height, with the one side being sloped by 30 degrees from a longitudinal side of the stamper.

Manufacturing Example 4

Stamper 2

Figure 4:
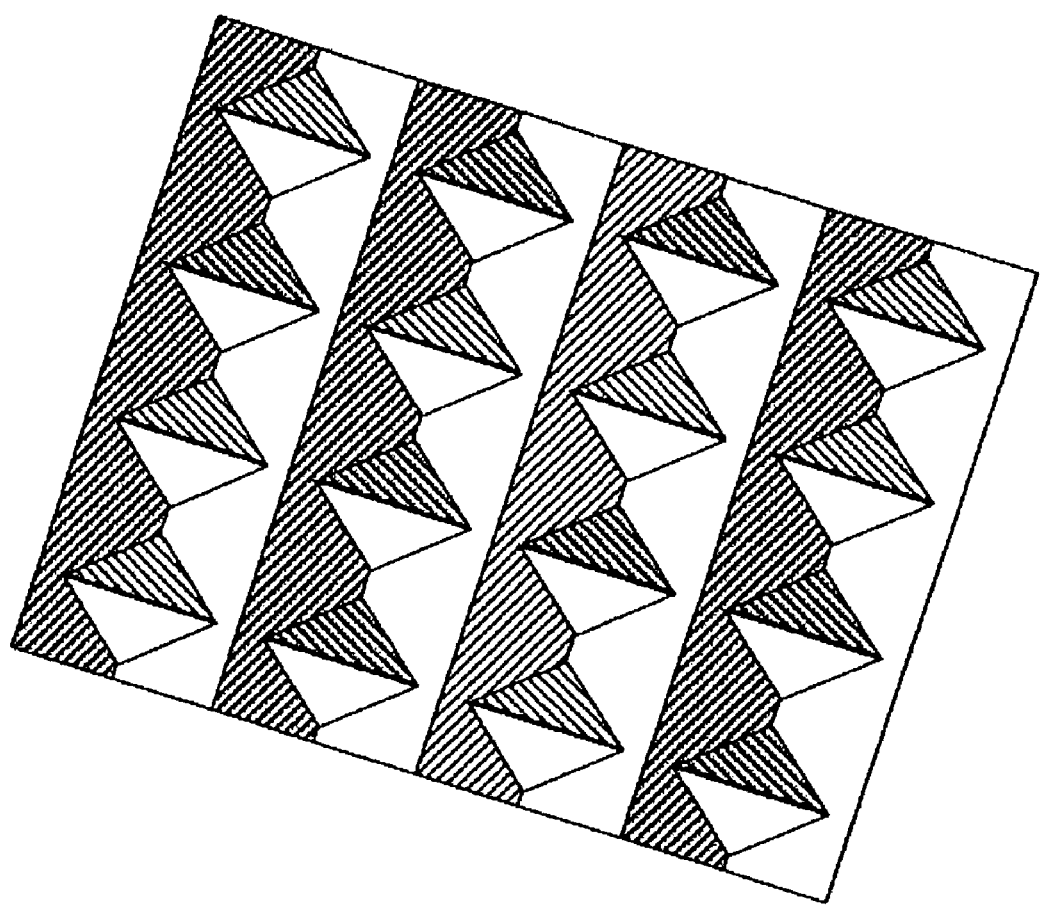
FIG. 4 is a top surface view of one example of a metallic member used in a mold in the present invention.

A whole surface of a stainless steel SUS430 (hereinafter, may be referred to as a "metallic member") of 387 mm×308 mm in dimension and of 2 mm in thickness was electroless-nickel-phosphorous-plated to a thickness of 100 μm. A diamond cutting tool of which apex angle was 90 degrees was used to cut and machine in a direction sloped by 30 degrees relative to a side of 387 mm in length (longitudinal side) on the resultant nickel-phosphorous electroless plating surface, thereby obtaining thereon protrusions of prismatic ridges having a sawtooth-shaped cross-section of 70 μm in width, 35 μm in height, 70 μm in pitch, and 90 degrees in apex angle. The prismatic ridges were further cut in a perpendicular direction for forming such that apexes of prismatic ridges, having a sawtooth-shaped cross-section, of 70 μm in width, 29.4 μm in height (of which depth results in the same value), 70 μm in pitch, and 100 degrees in apex angle coincided with those of the prismatic ridges. The metallic member had a shape in which V-shaped cuttings of 29.4 μm in depth were consecutively formed in prismatic ridges, having a sawtooth-shaped cross-section, of which pitch was 70 μm and apex angle was 90 degrees. Further, on the electroless-nickel-phosphorous-plating surface of the metallic member having such shape, nickel was formed such that a thickness of 500 μm was achieved by electrocasting using a nickel sulfamate solution, and the nickel was peeled off from the electroless plating surface, thereby obtaining a stamper 2 having a concave shape as shown in FIG. 4.

Manufacturing Example 5

Stamper 3

Figure 5:
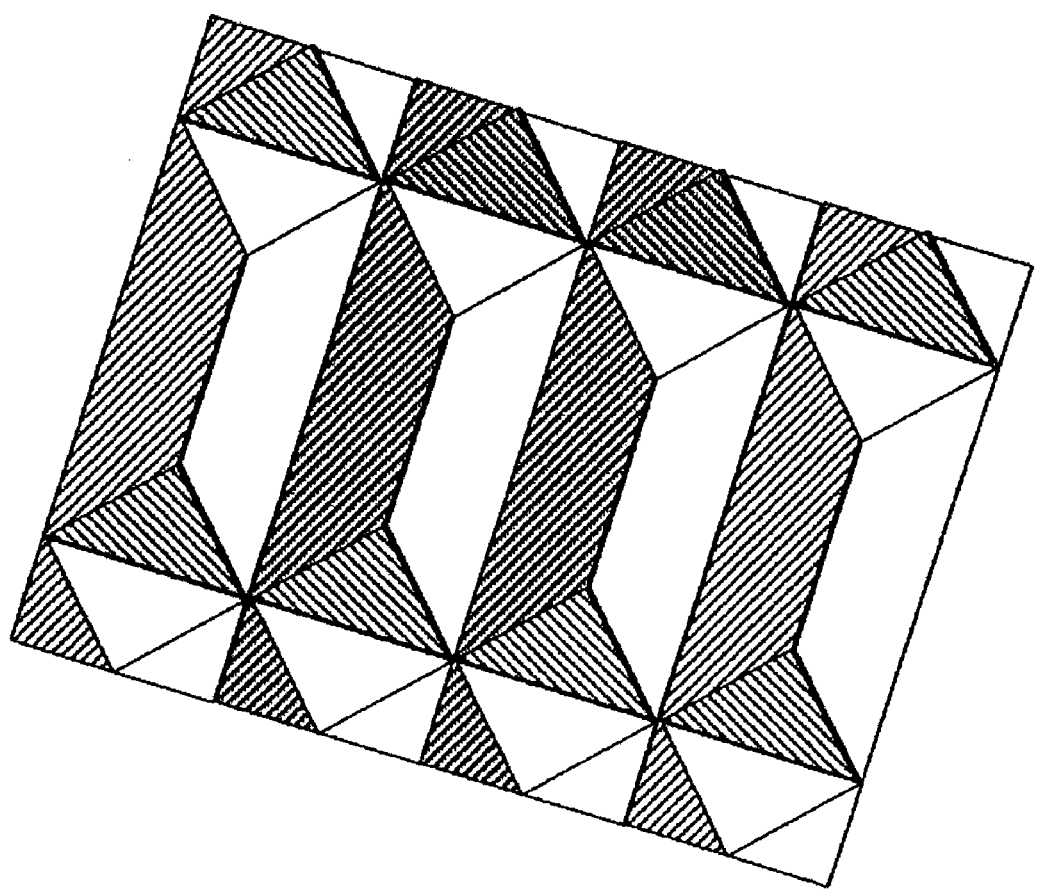
FIG. 5 is a top surface view of one example of a metallic member used in a mold in the present invention.

A whole surface of a stainless steel SUS430 (hereinafter, may be referred to as a "metallic member") of 387 mm×308 mm in dimension and of 2 mm in thickness was electroless-nickel-phosphorous-plated to a thickness of 100 μm. A diamond cutting tool of which apex angle was 90 degrees was used to cut and machine in a direction sloped by 30 degrees relative to a side of 387 mm in length (longitudinal side) on the resultant nickel-phosphorous electroless plating surface, thereby obtaining thereon protrusions of prismatic ridges having a sawtooth-shaped cross-section of 70 μm in width, 35 μm in height, 70 μm in pitch, and 90 degrees in apex angle. The prismatic ridges were further cut in a perpendicular direction for forming such that lowest points of V-shaped cuttings of 70 μm in width, 35 μm in height, 140 μm in pitch, and 90 degrees in apex angle coincided with those of the prismatic ridges. The metallic member is formed on its bottom surface with a shape formed by periodically repeating objects in a quadrangular 70 µm in one side and 140 µm in the other side and of 35 µm in height, having a side with an average slope of 45 degrees when observed in a direction perpendicular to each side of the quadrangular. Further, on the electroless-nickel-phosphorous-plating surface of the metallic member having such shape, nickel was formed such that a thickness of 500 µm was achieved by electrocasting using a nickel sulfamate solution, and the nickel was peeled off from the electroless plating surface, thereby obtaining a stamper 3 having a concave shape as shown in FIG. 5.

Manufacturing Example 6

Stamper 4

Figure 6:
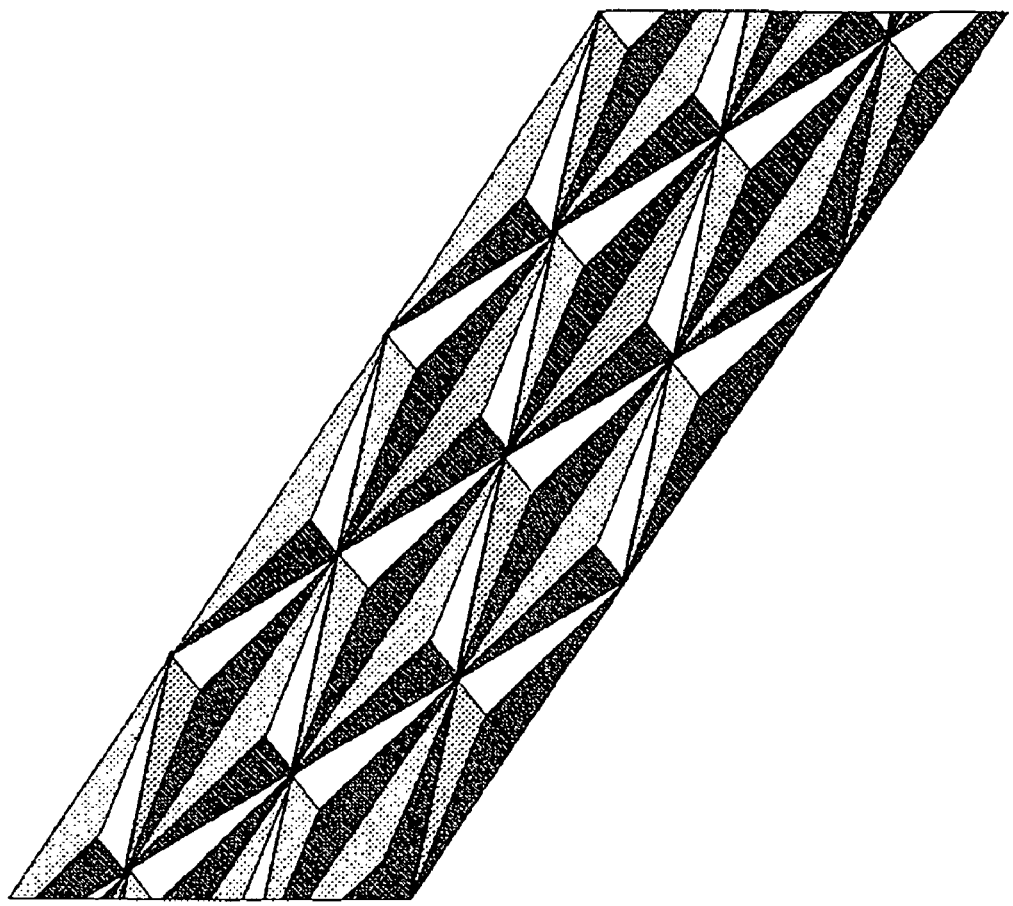
FIG. 6 is a top surface view of one example of a metallic member used in a mold in the present invention.

A whole surface of a stainless steel SUS430 of 387 mm×308 mm in dimension and of 2 mm in thickness was electroless-nickel-phosphorous-plated to a thickness of 100 µm. A diamond cutting tool of which apex angle was 60 degrees was used to cut and machine in a direction sloped by 34 degrees relative to a side of 387 mm in length (longitudinal side) on the resultant nickel-phosphorous electroless plating surface, thereby obtaining thereon protrusions of prismatic ridges 1 having a sawtooth-shaped cross-section of 70 µm in width, 61 µm in height, 70 µm in pitch, and 60 degrees in apex angle. Further, a diamond cutting tool of which apex angle was 60 degrees was used to perform cutting a side of 387 mm in length (longitudinal side) in a direction sloped by 61 degrees for forming such that apexes of the prismatic ridges having a sawtooth-shaped cross-section 2 of 70 µm in width, 61 µm in height, 70 µm in pitch, and 60 degrees in apex angle coincided with those of the prismatic ridges 1. Still further, a diamond cutting tool of which apex angle was 60 degrees was used to perform cutting in a direction sloped by 81 degrees relative to a side of 387 mm in length (longitudinal direction) for forming such that lowest points of the prismatic ridges having a sawtooth-shaped cross-section of 70 µm in width, 61 µm in height, 70 µm in pitch, and 60 degrees in apex angle coincided with those of the prismatic ridges 1 and 2, thereby obtaining a stamper 4. The resultant stamper 4 was formed such that shapes of which bottom surface was triangular and of which height was 61 µm were periodically repeated, as shown in FIG. 6.

Manufacturing Example 7

Stamper 5

A whole surface of a stainless steel SUS430 of 387 mm×308 mm in dimension and of 2 mm in thickness was electroless-nickel-phosphorous-plated to a thickness of 100 µm. A diamond cutting tool of which apex angle was 90 degrees was used to cut and machine into a parallel direction relative to a side of 387 mm in length (longitudinal side) on the resultant nickel-phosphorous electroless plating surface, thereby obtaining thereon protrusions of prismatic ridges having a sawtooth-shaped cross-section of 70 µm in width, 61 µm in height, 70 µm in pitch, and 60 degrees in apex angle. The prismatic ridges were further cut in a perpendicular direction for forming such that apexes of prismatic ridges, having a sawtooth-shaped cross-section, of 70 µm in width, 35 µm in height (of which depth results in the same value), 70 µm in pitch, and 90 degrees in apex angle coincided with those of the prismatic ridges. This metallic member is shaped such that V-shaped apexes of 35 µm in depth were continuously formed in the prismatic ridges having a sawtooth-shaped cross-section of 70 µm in pitch and of 60 degrees in apex angle. Still further, on the nickel-phosphorous electroless plating surface of the metallic member, nickel of 500 µm in thickness was formed by electrocasting using a nickel sulfamate solution, and the nickel was peeled off from the electroless plating surface, thereby obtaining a stamper 5 having a concave shape.

Manufacturing Example 8

Stamper 6

Figure 7:
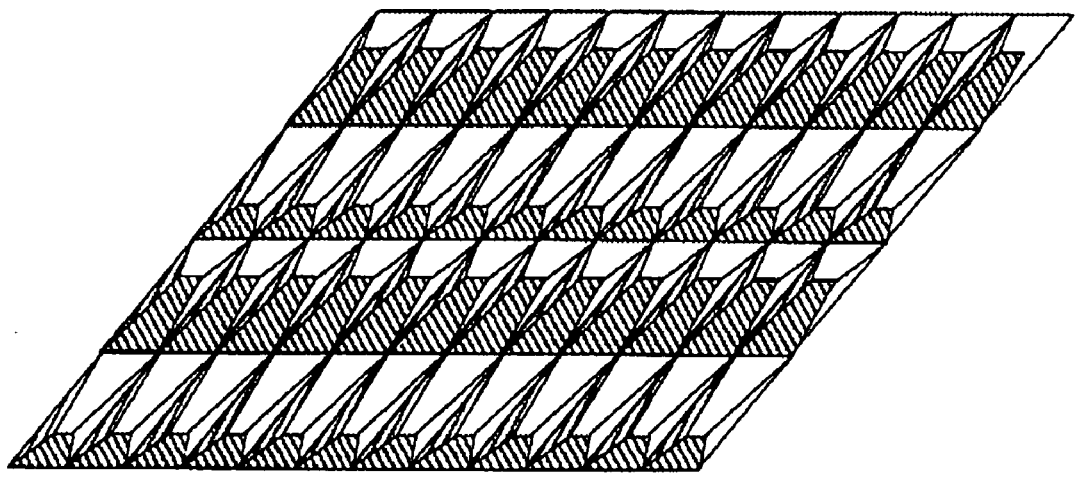
FIG. 7 is a top surface view of one example of a metallic member used in a mold in the present invention.

A whole surface of a stainless steel SUS430 of 387 mm×308 mm in dimension and of 2 mm in thickness was electroless-nickel-phosphorous-plated to a thickness of 100 µm. Diamond cutting tools of which apex angles were 150 degrees and 100 degrees were used to alternately cut and machine in a direction parallel to a side of 387 mm in length (longitudinal side) on the resultant nickel-phosphorous electroless plating surface, thereby obtaining thereon V-shaped grooves one of which was 70 µm in width, 9.4 µm in depth, and 150 degrees in bottom angle and the other of which was 22.4 µm in width, 9.4 µm in depth, and 100 degrees in bottom angle. Still further, a side of 387 mm in length (longitudinal side) is cut in a direction sloped by 35 degrees to form a shape such that lowest points of the V-shaped grooves of 70 µm in width, 70 µm in pitch, and 60 degrees in bottom angle coincided with those of the prismatic ridges, thereby obtaining a stamper 6. The resultant stamper 6 had a convex shape such that parallelograms of 70 µm in one side on its bottom surface and of which one side was sloped by 30 degrees relative to a longitudinal side of the stamper were periodically repeated, as shown in FIG. 7.

Manufacturing Example 9

Stamper 7

A whole surface of a stainless steel SUS430 of 387 mm×308 mm in dimension and of 2 mm in thickness was electroless-nickel-phosphorous-plated to a thickness of 100 µm. A diamond cutting tool of which apex angle was 170 degrees was used to cut and machine protrusions of prismatic ridges having a sawtooth-shaped cross-section of 70 µm in width, 3.1 µm in height, 70 µm in pitch, and 170 degrees in apex angle in a direction sloped by 30 degrees relative to a side of 387 mm in length (longitudinal side) on the resultant nickel-phosphorous electroless plating surface. The prismatic ridges were further cut in a perpendicular direction to form a shape such that apexes of prismatic ridges having a sawtooth-shaped cross-section of 70 µm in width, 3.1 µm in height, 70 µm in pitch, and 170 degrees in apex angle coincided with those of the prismatic ridges, thereby obtaining a stamper 7. The resultant stamper 7 had a convex shape formed by periodically repeating tetragonal pyramids of 70 µm in one side on its square bottom surface, of 3.1 µm in height, and of which one side was sloped by 30 degrees relative to a longitudinal side of the stamper.

Manufacturing example 10

Stamper 8

A whole surface of a stainless steel SUS430 of 387 mm×308 mm in dimension and of 2 mm in thickness was electroless-nickel-phosphorous-plated to a thickness of 100 µm. A diamond cutting tool of which apex angle was 110 degrees was used to cut and machine protrusions of prismatic ridges having a sawtooth-shaped cross-section of 80 µm in width, 28.0 µm in height, 80 µm in pitch, and 110 degrees in apex angle in a direction parallel to a side of 387 mm in length (longitudinal side) on the resultant nickel-phosphorous electroless plating surface. The prismatic ridges were further cut in a perpendicular direction to form prismatic ridges having a sawtooth-shaped cross-section of 28.0 µm in height, 66.8 µm in pitch, and 100 degrees in apex angle, thereby obtaining a stamper 8. The resultant stamper 8 had a convex shape formed by periodically repeating tetragonal pyramids of 80 µm and 66.8 µon its rectangular bottom surface and of 28.0 µm in height.

Manufacturing Example 11

Stamper 9

On the nickel-phosphorous electroless plating surface of the convex tetragonal pyramid members obtained by the manufacturing example 10, nickel of 500 µm in thickness was formed by electrocasting using a nickel sulfamate solution, and the nickel was peeled off from the electroless plating surface, whereby a stamper 9 having a concave shape formed by periodically repeating tetragonal pyramids was obtained.

Manufacturing Example 12

Pellets 3 for the Light Diffusing Plate

Pellets 3 for the light diffusing plate were manufactured similarly to the manufacturing example 1 except that as a transparent resin, a copolymer of an aromatic vinyl monomer and (meth)acrylic acid alkyl ester having a lower alkyl group (MX 150, styrene-methyl methacrylate copolymer, manufactured by PS Japan Corporation) was used. A total light transmittance of the pellets for the light diffusing plate was 92% and a haze thereof was 87%.

Manufacturing Example 13

Polymerizable Composition

In a mixture of 30 parts by weight of methyl methacrylate and 70 parts by weight of styrene, 0.4 part of t-hexyl peroxy pivalate and 0.4 part of bis(4-t-butylcyclohexyl)peroxydicarbonate, as a polymerization initiator were added. The resultant mixture was stirred for 30 minutes. This is followed by deaeration under a reduced pressure, whereby a polymerizable composition was obtained.

Manufacturing Example 14

Forming Roll

A nickel-phosphorous plating (phosphorus-containing ratio of 10% by weight) of 100 µm in thickness was applied to a surface of a stainless roll of 200 mm in diameter and 300 mm in length. On a whole surface thereof, a diamond bite of which apex angle was 90 degrees was used to form prismatic ridges of 70 µm in width, 35 µm in height, and 70 µm in pitch in a direction sloped by 30 degrees relative to a length direction of the roll, and the same diamond bite was used to form on the whole surface prismatic ridges of 70 µm in width, 35 µm in height, and 70 µm in pitch in a direction perpendicular to the prismatic ridges. As a result, a forming roll having a convex shape was obtained.

Manufacturing Example 15

Metal Mold Member

A nickel-phosphorous plating (phosphorus-containing ratio of 10% by weight) of 100 µm in thickness was applied to a surface of a stainless block of 237 mm×315 mm×100 mm. On a whole surface thereof, a diamond bite of which apex angle of 90 degrees was used to form prismatic ridges of 70 µm in width, 35 µm in height, and 70 µm in pitch in a direction sloped by 30 degrees relative to a side of 315 mm in length, and the same diamond bite was used to form on the whole surface prismatic ridges of 70 µm in width, 35 µm in height, and 70 µm in pitch in a direction perpendicular to the prismatic ridges. As a result, a metal mold member having a convex shape was obtained.

Example 1

A reflection sheet (RF188 manufactured by TSUJIDEN CO., LTD.) was attached onto an inner surface of a creamy white plastic case of 305 mm in inner dimension of width, 227 mm in depth, and 17 mm in height to obtain a reflection plate. Keeping 3.5 mm from a bottom of the reflection plate, eight pieces of cold-cathode tubes of 3 mm in diameter and 360 mm in length were disposed such that the distance $a_L$ between the central axes of the cold-cathode tubes was 24.5 mm. Portions near electrodes were fixed with silicone sealant, and an inverter was attached. In a back-light device of this design, the distance $b_L$ between the central axis of the cold-cathode tube and a surface facing the cold-cathode tube of the light diffusion plate was 13.5 mm. Thus, by substituting values of $a_L$ and $b_L$ into an expression which represents the relationship L1 to evaluate a suitable range of the gradients Xn (degree) of the side of the structural unit, a range of $7.0<Xn<71.2$ is obtained.

Subsequently, a metal mold to which the stamper 1 obtained in the manufacturing example 2 was attached was prepared. Together with this metal mold, the pellets 1 for the light diffusing plate obtained in the manufacturing example 1 was used. An injection molder (4,410 kN of mold clamping force) was employed to mold a light diffusion plate, of 2 mm in thickness and 237 mm×315 mm in size, having a concave surface shape to which a tetragonal pyramid was transcribed, at a cylinder temperature of 280° C. and a metal mold temperature of 85° C. When the surface of the resultant light diffusion plate was observed with an ultra-deep microscope of a direction which passed through a bottom point of the concave structural unit and which was vertical to a longitudinal side of the light diffusion plate. It was found that: there were two types of gradients of the side surface of the concave structural unit, one of the gradient angles was 41 degrees for X1 and the other thereof was 27 degrees for X2; the maximum height Rz was 34.3 µm; and a surface roughness Ra was 0.005 µm.

The above-described light diffusion plate was set on the plastic case to which a cold-cathode tube was attached such that the concave structural unit was positioned on an opposite side (anti-source location) to the cold-cathode tube. Further, the prism sheet (Thick-RBEF manufactured by Sumitomo 3M Limited) was set such that a longitudinal direction of the prismatic ridges of the prism sheet was parallel to the cold-cathode tube and positioned opposite to the light diffusion plate. A reflecting polarizer utilizing birefringence (DBEF-D manufactured by Sumitomo 3M Limited) was set thereon, and a polarizing plate was further attached, whereby a direct type back-light device was produced.

Subsequently, the produced direct type back-light device was applied a tube current of 5 mA to light the cold-cathode tube. Brightness in a frontal direction was measured with a two-dimensional color distribution meter at 100 points on the central axis in a short-side direction at regular intervals, whereby an average brightness value La and brightness unevenness Lu were obtained according to below-described expression 2 and expression 3. At this time, the average brightness value was 4,401 cd/m² and the brightness unevenness was 0.76.

Average brightness value $La=(L1+L2)/2$ (Expression 2)

Brightness unevenness $Lu=((L1-L2)/La)\times 100$ (Expression 3), where
L1: Average of brightness maximal values immediately above the cold-cathode tubes provided in plurality; and
L2: Average of minimal values between maximal values.

The brightness unevenness is an index indicating uniformity in brightness, and when the brightness unevenness is poor, the value becomes large.

Example 2

A direct type back-light device was produced by the same manner as the example 1 except that a diffusion sheet (188GM2 manufactured by Kimoto Co., Ltd.) was used instead of the prism sheet, and a tube current was set to 5.5 mA. In this condition, an evaluation thereof was conducted. The average brightness value was 4,521 cd/m² and the brightness unevenness was 0.91.

Example 3

A direct type back-light device was produced by the same manner as the example 1 except that as members on the light diffusion plate, a diffusion sheet, a prism sheet, a diffusion sheet, and a polarizing plate were arranged in order from a side facing the light diffusion plate, and a tube current was set to 7 mA. In this condition, an evaluation thereof was conducted. The average brightness value was 4,413 cd/m² and the brightness unevenness was 0.89.

Example 4

A direct type back-light device was produced by the same manner as the example 1 except that as members on the light diffusion plate, a diffusion sheet, a diffusion sheet, and a polarizing plate were arranged in order from a side facing the light diffusion plate, and a tube current was set to 7 mA. In this condition, an evaluation thereof was conducted. The average brightness value was 4,291 cd/m² and the brightness unevenness was 0.99.

Example 5

A direct type back-light device was produced by the same manner as the example 1 except that: the light diffusion plate produced by using a metal mold to which the stamper 2 obtained in the manufacturing example 3 was attached was used; as members on the light diffusion plate, a diffusion sheet, a reflecting polarizer utilizing birefringence, and a polarizing plate were arranged in order from a side facing the light diffusion plate; and a tube current was set to 5.5 mA. In this condition, an evaluation thereof was conducted. It was found that: there were two types of gradients of the side surface of the concave structural unit of the resultant light diffusion plate, one of the gradient angles was 41 degrees for X1 and the other thereof was 23 degrees for X2; and a maximum height Rz was 34.3 μm. The average brightness value was 4,560 cd/m² and the brightness unevenness was 0.87.

Example 6

A direct type back-light device was produced by the same manner as the example 1 except that: the light diffusion plate produced by using a metal mold to which the stamper 3 obtained in the manufacturing example 4 was attached was used; as members on the light diffusion plate, a diffusion sheet, a reflecting polarizer utilizing birefringence, and a polarizing plate were arranged in order from a side facing the light diffusion plate; and a tube current was set to 5.5 mA. In this condition, an evaluation thereof was conducted. It was found that: there were two types of gradients of the side surface of the convex structural unit of the resultant light diffusing plate, one of the gradient angles was 41 degrees for X1 and the other thereof was 27 degrees for X2; and a maximum height Rz was 34.1 μm. The average brightness value was 4,631 cd/m² and the brightness unevenness was 0.98.

Example 7

A direct type back-light device was produced by the same manner as the example 1 except that: the light diffusion plate produced by using a metal mold to which the stamper 4 obtained in the manufacturing example 5 was attached was used; as members on the light diffusion plate, a diffusion sheet, a reflecting polarizer utilizing birefringence, and a polarizing plate were arranged in order from a side facing the light diffusion plate; and a tube current was set to 5.5 mA. In this condition, an evaluation thereof was conducted. It was found that: there were three types of gradients of the side surface of the concave structural unit of the resultant light diffusing plate, one of the gradient angles was 55 degrees for X1, another was 40 degrees for X2, and the other was 15 degrees for X3; and a maximum height Rz was 59.4 μm. The average brightness value was 4,512 cd/m² and the brightness unevenness was 0.77.

Example 8

A direct type back-light device was produced by the same manner as the example 1 except that: six cold-cathode tubes were used; the distance $a_L$ between central axes of the cold-cathode tubes was set to 40 mm; as members on the light diffusion plate, a diffusion sheet, a prism sheet, a reflecting polarizer utilizing birefringence, and a polarizing plate were arranged in order from a side facing the light diffusion plate; and a tube current was set to 7 mA. In this condition, an evaluation thereof was conducted. A suitable range of the gradients Xn (degree) of the side surface of the convex structural unit calculated by the expression indicating the relationships L1 is 9.1<Xn<76.6. The average brightness value was 4,060 cd/m² and the brightness unevenness was 0.40.

Example 9

A direct type back-light device was produced by the same manner as the example 1 except that: the light diffusion plate produced by using a metal mold to which the stamper 5 obtained in the manufacturing example 6 was attached was used; and the convex structural unit was arranged to face the cold-cathode tube. In this condition, an evaluation thereof was conducted. It was found that: there were two types of gradients of the side surface of the convex structural unit of the resultant light diffusion plate, one of the gradient angles was 60 degrees for X1 and the other thereof was 27 degrees for X2; a maximum height Rz was 34.1 μm. The average brightness value was 4,313 cd/m² and the brightness unevenness was 0.72.

Example 10

A direct type back-light device was produced by the same manner as the example 1 except that the light diffusion plate produced by using a metal mold to which the stamper 6 obtained in the manufacturing example 7 was attached was used. In this condition, an evaluation thereof was conducted. It was found: that there were three types of gradients of the side surface of the concave structural unit of the resultant light diffusion plate, one of the gradient angles was 55 degrees for X1, another was 40 degrees for X2, and the other was 15 degrees for X3; and a maximum height Rz was 9.2 μm. The average brightness value was 4,543 cd/m² and the brightness unevenness was 0.78.

Comparative Example 1

A direct type back-light device was produced by the same manner as the example 1 except that the light diffusion plate produced by using a metal mold to which the stamper 7 of the manufacturing example 8 was attached was used. In this condition, an evaluation thereof was conducted. It was found that: there were two types of gradients of the side surface of the concave structural unit of the resultant light diffusion plate, one of the gradient angles was 4 degrees for X1, the other thereof was 3 degrees for X2; and a maximum height Rz was 3 μm. The average brightness value was 4,693 cd/m² and the brightness uniformity was 8.48.

Comparative Example 2

A direct type back-light device was produced by the same manner as the example 2 except that the light diffusion plate produced by using a metal mold to which the stamper 7 of the manufacturing example 8 was attached was used. In this condition, an evaluation thereof was conducted. The average brightness value was 4,467 cd/m² and the brightness uniformity was 2.74.

Comparative Example 3

A direct type back-light device was produced by the same manner as the example 3 except that the light diffusion plate produced by using a metal mold to which the stamper 7 of the manufacturing example 8 was attached was used. In this condition, an evaluation thereof was conducted. The average brightness value was 4,416 cd/m² and the brightness uniformity was 2.14.

Comparative Example 4

A direct type back-light device was produced by the same manner as the example 4 except that the light diffusion plate produced by using a metal mold to which the stamper 7 of the manufacturing example 8 was attached was used. In this condition, an evaluation thereof was conducted. The average brightness value was 4,302 cd/m² and the brightness uniformity was 2.21.

Table 1 shows configurations of the examples 1 to 10 and measurement results thereof, and Table 2 shows configurations of the comparative examples 1 to 4 and measurement results thereof.

TABLE 1

| | Examples | | | | | | |
|---|---|---|---|---|---|---|---|
| | 1 | 2 | 3 | 4 | 5 | 6 | 7 |
| polarizing plate | ○ | ○ | ○ | ○ | ○ | ○ | ○ |
| reflecting polarizer using birefringence | ○ | ○ | Diffusion sheet | – | ○ | ○ | ○ |
| Prism sheet | ○ | – | ○ | Diffusion sheet | – | – | – |
| Diffusion sheet | – | ○ | ○ | ○ | ○ | ○ | ○ |
| Light diffusion plate Gradient of sloped side of concave structure or convex structure | | | | | | | |
| X1 [degree] | 41 | 41 | 41 | 41 | 41 | 41 | 55 |
| X2 [degree] | 27 | 27 | 27 | 27 | 23 | 27 | 40 |
| X3 [degree] | – | – | – | – | – | – | 15 |
| Location of concave structure or convex structure | light emitting surface | light emitting surface | light emitting surface | light emitting surface | light emitting surface | light emitting surface | light emitting surface |
| Rz of main surface with concave structure or convex structure [μm] | 34.3 | 34.3 | 34.3 | 34.3 | 34.3 | 34.1 | 59.4 |
| Haze [%] | 89 | 89 | 89 | 89 | 89 | 89 | 89 |
| Total light transmittance [%] | 94 | 94 | 94 | 94 | 94 | 94 | 94 |
| Linear light source | | | | | | | |
| The number of tubes | 8 | 8 | 8 | 8 | 8 | 8 | 8 |
| Distance "a" between light sources [mm] | 24.5 | 24.5 | 24.5 | 24.5 | 24.5 | 24.5 | 24.5 |

TABLE 1-continued

|  | Examples | | | | | | |
| --- | --- | --- | --- | --- | --- | --- | --- |
|  | 1 | 2 | 3 | 4 | 5 | 6 | 7 |
| Distance "b" between light source and light diffusion plate [mm] | 13.5 | 13.5 | 13.5 | 13.5 | 13.5 | 13.5 | 13.5 |
| Evaluation | | | | | | | |
| Average brightness [cd/m²] | 4401 | 4521 | 4413 | 4291 | 4560 | 4631 | 4512 |
| Brightness uniformity | 0.76 | 0.91 | 0.89 | 0.99 | 0.87 | 0.98 | 0.77 |

○ (circle) indicates that an optical member in the leftmost column in Table is used.

– (minus sign) indicates "not used".

When a component name is listed, it indicates that the optical member in the leftmost column is replaced by the component listed.

TABLE 2

|  | Examples | | | Comparative Examples | | | |
| --- | --- | --- | --- | --- | --- | --- | --- |
|  | 8 | 9 | 10 | 1 | 2 | 3 | 4 |
| polarizing plate | ○ | ○ | ○ | ○ | ○ | ○ | ○ |
| reflecting polarizer using birefringence | ○ | ○ | ○ | ○ | ○ | Diffusion sheet | – |
| Prism sheet | ○ | ○ | – | ○ | – | ○ | Diffusion sheet |
| Diffusion sheet | ○ | – | ○ | – | ○ | ○ | ○ |
| Light diffusion plate Gradient of sloped side of concave structure or convex structure | | | | | | | |
| X1 [degree] | 41 | 60 | 55 | 4 | 4 | 4 | 4 |
| X2 [degree] | 27 | 27 | 40 | 3 | 3 | 3 | 3 |
| X3 [degree] | – | – | 15 | – | – | – | – |
| Location of concave structure or convex structure | light emitting surface | Light incident surface | light emitting surface | light emitting surface | light emitting surface | light emitting surface | light emitting surface |
| Rz of main surface with concave structure or convex structure [μm] | 34.3 | 34.1 | 9.2 | 3 | 3 | 3 | 3 |
| Haze [%] | 89 | 89 | 89 | 89 | 89 | 89 | 89 |
| Total light transmittance [%] | 94 | 94 | 94 | 94 | 94 | 94 | 94 |
| Linear light source | | | | | | | |
| The number of tubes | 6 | 8 | 8 | 8 | 8 | 8 | 8 |
| Distance "a" between light sources [mm] | 40.0 | 24.5 | 24.5 | 24.5 | 24.5 | 24.5 | 24.5 |
| Distance "b" between light source and light diffusion plate [mm] | 13.5 | 13.5 | 13.5 | 13.5 | 13.5 | 13.5 | 13.5 |
| Evaluation | | | | | | | |
| Average brightness [cd/m²] | 4060 | 4313 | 4543 | 4693 | 4467 | 4416 | 4302 |
| Brightness uniformity | 0.40 | 0.72 | 0.78 | 8.48 | 2.74 | 2.14 | 2.21 |

○ (circle) indicates that an optical member in the leftmost column in Table is used.

– (minus sign) indicates "not used".

When a component name is listed, it indicates that the optical member in the leftmost column is replaced by the component listed.

When the examples 1 to 10 and the comparative examples 1 to 4 are compared, if the gradients Xn of the side surface of the structural unit are in a range which satisfies the relationship L1, good values were obtained, i.e., the average brightness value of no less than 4,000 cd/m² and the brightness unevenness of no more than 1. In contrary, when the gradients Xn of the side surface of the structural unit are smaller than the range of the relationship L1 as in the comparative examples 1 to 4, the brightness unevenness increases.

Subsequently, a description is given of a case where an LED, which is a point light source, is used.

Example 11

On a bottom surface of a creamy white plastic case of 305 mm in inner dimension of width, 227 mm in depth, and 16 mm in height, a 0.5-mm heat-sink aluminum plate was set, and a reflection sheet (RF188 manufactured by TSUJIDEN CO., LTD.) was attached thereon as a reflection plate. Subsequently, white-colored chip type LEDs (NCCW002S manufactured by NICHIA CORPORATION: 7.2×11.2×4.7 mm in size), which were point light sources, were placed on a bottom of the reflection plate such that a center-to-center interval of the LEDs was disposed to be kept apart by 30 mm equally in vertical and horizontal directions (a manner shown in FIG. 8), and were wired such that a direct current could be supplied to electrodes. In the back-light device of this design, the distance $a_P$ between the centers of the LEDs is 36.2 mm and the distance $b_P$ between the LED center and a side facing the LEDs of the light diffusion plate is 13.15 mm, and thus, by substituting the values of $a_P$ and $b_P$ into the expression of the relationship P1 to evaluate a suitable range of the gradients Xn (degree) of the side surface of the structural unit, a range of 8.5<Xn<74.6 was obtained. The light diffusion plate, the diffusion sheet, the prism sheet, and the reflecting polarizer utilizing birefringence the same as those in the example 8 were mounted thereon, and a polarizing plate was attached thereto, whereby a direct type back-light device was produced.

Subsequently, the produced direct type back-light device was applied voltage of 3.8V and a current of 350 mA to illuminate the LEDs. In this condition, an evaluation the same as that in the example 1 was conducted. The average brightness value was 5,640 cd/m² and the brightness unevenness was 0.69.

Example 12

A direct type back-light device was produced by the same manner as the example 11 except that: the point light sources were arranged to be arrayed in a rectangular shape such that an interval in a longitudinal direction was set to 35 mm and an interval in a short-side direction was set to 30 mm; and a light diffusion plate was formed by arraying concave tetragonal pyramids using the stamper 8 by the manufacturing example 10. In the back-light device of this design, the distance $a_P$ between the centers of the LEDs is 45.1 mm and the distance $b_P$ between the LED center and a side facing the LEDs of the light diffusion plate is 13.15 mm, and thus, by substituting the values of $a_P$ and $b_P$ into the expression of the relationship P1 to evaluate a suitable range of the gradients Xn (degree) of the side surface of the structural unit, a range of 9.3<Xn<76.7 was obtained.

Subsequently, the produced direct type back-light device was applied voltage of 3.8V and a current of 350 mA to illuminate the LEDs. In this state, an evaluation the same as that in the example 1 was conducted. The average brightness value was 5,530 cd/m² and the brightness unevenness was 0.43.

Example 13

A direct type back-light device was produced by the same manner as the example 12 except that a light diffusion plate was formed by arraying convex tetragonal pyramids using the stamper 9 by the manufacturing example 11. In this condition, an evaluation thereof was conducted. The average brightness value was 5,560 cd/m² and the brightness unevenness was 0.40.

Comparative Example 5

A direct type back-light device using LEDs was produced by the same manner as the example 11 except that the light diffusion plate the same as that in the comparative example 1 was used. In this condition, an evaluation thereof was conducted. The average brightness value was 5,980 cd/m² and the brightness uniformity was 3.90.

Table 3 shows configurations of the examples 11 to 13 and those of the comparative example 5, and measurement results thereof.

TABLE 3

| | Examples | | | Comp. Ex. |
|---|---|---|---|---|
| | 11 | 12 | 13 | 5 |
| polarizing plate | ○ | ○ | ○ | ○ |
| reflecting polarizer using birefringence | ○ | ○ | ○ | ○ |
| Prism sheet | ○ | ○ | ○ | ○ |
| Diffusion sheet | ○ | ○ | ○ | ○ |
| Light diffusion plate | | | | |
| Gradient of sloped side of concave structure or convex structure | | | | |
| X1 [degree] | 41 | 36 | 36 | 4 |
| X2 [degree] | 27 | 20 | 20 | 3 |
| Location of concave structure or convex structure | light emitting surface | light emitting surface | light emitting surface | light emitting surface |
| Rz of main surface with concave structure or convex structure [μm] | 34.1 | 24.1 | 24.1 | 34.1 |
| Haze [%] | 89 | 85 | 85 | 89 |
| Total light transmittance [%] | 94 | 99 | 99 | 94 |
| Linear light source | | | | |
| Distance "a" between light sources [mm] | 36.2 | 45.1 | 45.1 | 36.2 |
| Distance "b" between light source and light diffusion plate [mm] | 13.15 | 13.15 | 13.15 | 13.15 |
| Evaluation | | | | |
| Average brightness [cd/m²] | 5640 | 5530 | 5560 | 5980 |
| Brightness uniformity | 0.69 | 0.43 | 0.40 | 3.90 |

○ (circle) indicates that an optical member in the leftmost column in Table is used.
− (minus sign) indicates "not used".

When the examples 11 to 13 and the comparative example 5 are compared, it is found that when the gradients Xn of the side surface of the structural unit are in a range which satisfies the expression indicating the relationship P1, improving effect of the brightness unevenness is great.

Example 14

A single-screw extruder was used to extrude the pellets 3 for the light diffusing plate obtained in the manufacturing example 12 from a T-die of 350 mm in width. As a result, a plate of 2.0 mm in thickness was obtained. A cylinder temperature of the single-screw extruder was set to 250° C., and a temperature of a die head was set to 240° C. The resultant plate was cut into pieces of 237 mm×315mm, whereby a flat light diffusion plate was obtained.

The resultant flat light diffusion plate was pressed against the forming roll of the manufacturing example 14, which was heated to 140° C., while the forming roll was rotated. Thereby, a light diffusion plate having a concave structural unit was manufactured.

In this condition, an evaluation thereof was conducted similarly to the example 11 except that the light diffusion plate having the concave structural units was used. The average brightness value was 5,724 cd/m$^2$ and the brightness unevenness was 0.69.

Example 15

On the same flat light diffusion plate as that in the example 14, an ultraviolet curable resin (UV SPA369 manufactured by Teikoku Printing Inks Mfg. Co., Ltd.) was applied to a thickness of 100 μm by a bar coater. The resultant light diffusion plate was irradiated with a high pressure mercury lamp by cumulative luminous energy of 100 mJ/cm$^2$ and cured to an extent so as not to flow. Further, the forming roll of the manufacturing example 14 was rotated and pressed against the surface thereof to apply a concave shape. Immediately thereafter, the light diffusion plate was irradiated with a high pressure mercury lamp by cumulative luminous energy of 150 mJ/cm$^2$ to complete the curing, whereby a light diffusion plate having a concave shape was produced. In this condition, an evaluation thereof was conducted similarly to the example 14 except that the light diffusion plate having a concave shape was used. The average brightness value was 5,667 cd/m$^2$ and the brightness unevenness was 0.49.

Example 16

On a polyethylene terephthalate film (hereinafter, referred to as a PET film) of 200 μm in thickness, the same ultraviolet curable resin as that in the example 15 was applied to a thickness of 100 μm by a bar coater. Further, the forming roll of the manufacturing example 14 was rotated and pressed against the resultant surface, and at the same time, the surface was irradiated with a high pressure mercury lamp from a side facing the PET film by cumulative luminous energy of 250 mJ/cm$^2$ to complete the curing, whereby a film having a concave shape was produced. The surface facing the PET film of this film was applied photocurable adhesive (ThreeBond 3017 manufactured by ThreeBond Co., Ltd.), and the resultant surface was attached onto the same flat light diffusion plate as that in the example 14 to produce a light diffusion plate having a concave shape. Light-curing of the adhesive was performed by irradiating the surface having a concave shape with a high pressure mercury lamp by cumulative luminous energy of 8,000 mJ/cm$^2$.

In this condition, an evaluation thereof was conducted similarly to the example 14 except that the light diffusion plate having a concave shape was used. The average brightness value was 5,639 cd/m$^2$ and the brightness unevenness was 0.48.

Example 17

Antirunning members of 10 mm in thickness were mounted at four corners of the metal mold member of the manufacturing example 15, and the polymerizable composition of the manufacturing example 13 was supplied such that a polymer becomes 2 mm in thickness. Polymerization was performed for 1 hour at 80° C. in a heating bath, and then, an infrared heater was used to continue the heating for 1 hour at 130° C. to complete the polymerization, whereby a light diffusion plate having a concave shape was produced.

In this condition, an evaluation thereof was conducted similarly to the example 11 except that the light diffusion plate was used. The average brightness value was 5,610 cd/m$^2$ and the brightness unevenness was 0.40.

Table 4 shows configurations of the examples 14 to 17 and measurement results thereof. According to the manufacturing methods of the examples, it is also possible to obtain good results.

TABLE 4

| | Examples | | | |
|---|---|---|---|---|
| | 14 | 15 | 16 | 17 |
| polarizing plate | ○ | ○ | ○ | ○ |
| reflecting polarizer using birefringence | ○ | ○ | ○ | ○ |
| Prism sheet | ○ | ○ | ○ | ○ |
| Diffusion sheet | ○ | ○ | ○ | ○ |
| Light diffusion plate Gradient of sloped side of concave structure or convex structure | | | | |
| X1 [degree] | 41 | 41 | 41 | 41 |
| X2 [degree] | 27 | 27 | 27 | 27 |
| Location of concave structure or convex structure | light emitting surface | light emitting surface | light emitting surface | light emitting surface |
| Rz of main surface with concave structure or convex structure [μm] | 34.3 | 34.8 | 35.0 | 34.9 |
| Haze [%] | 87 | 87 | 87 | 87 |
| Total light transmittance [%] | 92 | 92 | 92 | 92 |
| Linear light source | | | | |
| Distance "a" between light sources [mm] | 36.2 | 36.2 | 36.2 | 36.2 |
| Distance "b" between light source and light diffusion plate [mm] | 13.15 | 13.15 | 13.15 | 13.15 |
| Evaluation | | | | |
| Average brightness [cd/m$^2$] | 5724 | 5667 | 5639 | 5610 |
| Brightness uniformity | 0.69 | 0.49 | 0.48 | 0.40 |

○ (circle) indicates that an optical member in the leftmost column in Table is used.
− (minus sign) indicates "not used".

INDUSTRIAL APPLICABILITY

According to the direct type back-light device in the present invention, it is possible to improve the average brightness and the brightness uniformity while a distance between the linear light source and the light diffusion plate is small, and thus, when a direct type back-light device is assembled into a liquid crystal display, it is possible to obtain a high-quality-image-and-thin liquid crystal display.

The invention claimed is:

1. A direct type back-light device comprising:
a reflection plate,
a plurality of linear light sources disposed in parallel to each other, and
a light diffusion plate, disposed in this order,
wherein the light diffusion plate comprises:
a plurality of concave or convex structural units, in which each of the units has three or more sloped sides, on at least one main surface,
a maximum height Rz of the main surface having the structural units being not more than 1000 μm, and
a portion which lies immediately above a region between central axes of adjacent linear light sources in which the portion (1) has no less than two outlines of the sloped sides which have different gradients from each other in a vertical cross-section of the light diffusion plate, and
(2) satisfies a relationship of $12.5-10\times(bL/aL)<Xn<85-25\times(b_L/aL)$, in which the aL(mm) is an average distance between the central axes of the adjacent linear light sources, the bL(mm) is a minimum distance between the central axis of the linear light source and the main surface facing the linear light source in the light diffusion plate, and the Xn(deg.) is a gradient of the nth outline in the vertical cross-section of the light diffusion plate in which the n is a subindex for representing each outline, in which a cutting-plane line of the vertical cross section of the light diffusion plate has a direction perpendicular to a central axis direction of the linear light source.

2. The direct type back-light device according to claim 1, wherein
the structural units are convex each, and
the structural units are obtained by applying a V-shaped cutting in prismatic ridges having a sawtooth-shaped cross-section in a direction different from a ridge line direction of the prismatic ridges.

3. The direct type back-light device according to claim 2, wherein each shape of the structural units is pyramidal or truncated pyramidal.

4. The direct type back-light device according to claim 1, wherein
the structural units are concave each, and
the structural units are obtained by transcribing a convex shape of a transcribing member having the convex shape to prismatic ridges having a sawtooth-shaped cross-section, the transcribing member being obtained by applying a V-shaped cutting in a direction different from a ridge line direction of the prismatic ridges.

5. The direct type back-light device according to claim 4, wherein each shape of the structural units is pyramidal or truncated pyramidal.

6. The direct type back-light device according to claim 1, wherein
the light diffusion plate is made of a resin composition containing transparent resin and light diffusing agent, and
a total light transmittance of the resin composition is no less than 60% and no more than 98%.

7. The direct type back-light device according to claim 6, wherein
the light diffusion plate is made of a resin composition containing transparent resin and light diffusing agent, and
a haze of the resin composition is no less than 20% and no more than 100%.

8. The direct type back-light device according to claim 6, wherein the light diffusing agent is polystyrene polymer, or polysiloxane polymer, or a crosslinked product thereof.

9. The direct type back-light device according to claim 1, wherein the light diffusion plate is formed of transparent resin of which water absorption is no more than 0.25%.

10. The direct type back-light device according to claim 1, in which a difference between the gradients of the two outlines is no less than 2 degrees.

11. The direct type back-light device according to claim 1, in which a part or a whole of the sloped sides are rough.

12. The direct type back-light device according to claim 1, in which the sloped sides have an arithmetic average height Ra of not less than 0.08μm and not more than 3μm.

13. A direct type back-light device comprising:
a reflection plate,
a plurality of point light sources and
a light diffusion plate, disposed in this order,
wherein the light diffusion plate comprises:
a plurality of concave or convex structural units, in which each of the units has three or more sloped sides, on at least one main surface,
a maximum height Rz of the main surface having the structural units being not more than 1000 μm, and
a portion lying immediately above a region which is surrounded by adjacent three point light sources and which does not include other point light sources in the region,
in which the portion (1) has no less than two outlines of the sloped sides which have different gradients from each other in a vertical cross-section of the light diffusion plate and
(2) satisfies a relationship of $12.5-11\times(bp/ap)<Xn<85-28.5\times(bp/ap)$, in which the ap(mm) is an average distance among the centers of the three adjacent point light sources, the bp(mm) is a minimum distance between the center of the point light source and the main surface facing the point light source in the light diffusion plate, and the Xn(deg.) is a gradient of the n-th outline in the vertical cross-section of the light diffusion plate in which the n is a subindex for representing each outline, in which a cutting-plane line of the vertical cross section of the light diffusion plate has a direction perpendicular to a direction which links centers of two point light sources out of the three point light sources.

14. The direct type back-light device according to claim 13, wherein
the structural units are convex each, and
the structural units are obtained by applying a V-shaped cutting in prismatic ridges having a sawtooth-shaped cross-section in a direction different from a ridge line direction of the prismatic ridges.

15. The direct type back-light device according to claim 14, wherein each shape of the structural units is pyramidal or truncated pyramidal.

16. The direct type back-light device according to claim 13, wherein
the structural units are concave each, and
the structural units are obtained by transcribing a convex shape of a transcribing member having the convex shape to prismatic ridges having a sawtooth-shaped cross-section, the transcribing member being obtained by applying a V-shaped cutting in a direction different from a ridge line direction of the prismatic ridges.

17. The direct type back-light device according to claim 16, wherein each shape of the structural units is pyramidal or truncated pyramidal.

18. The direct type back-light device according to claim 13, wherein the light diffusion plate is made of a resin composition containing transparent resin and light diffusing agent, and a total light transmittance of the resin composition is no less than 60% and no more than 98%.

19. The direct type back-light device according to claim 18, wherein the light diffusion plate is made of a resin composition containing transparent resin and light diffusing agent, and a haze of the resin composition is no less than 20% and no more than 100%.

20. The direct type back-light device according to claim 18, wherein the light diffusing agent is polystyrene polymer, or polysiloxane polymer, or a crosslinked product thereof.

21. The direct type back-light device according to claim 13, wherein the light diffusion plate is formed of transparent resin of which water absorption is no more than 0.25%.

22. The direct type back-light device according to claim 13, in which a difference between the gradients of the two outlines is no less than 2 degrees.

23. The direct type back-light device according to claim 13, in which a part or a whole of the sloped sides are rough.

24. The direct type back-light device according to claim 13, in which the sloped sides have an arithmetic average height Ra of not less than 0.08μm and not more than 3μm.

* * * * *